United States Patent
Jung et al.

(10) Patent No.: US 12,523,963 B2
(45) Date of Patent: Jan. 13, 2026

(54) HOLOGRAM DISPLAY DEVICE

(71) Applicant: Samsung Display Co., LTD., Yongin-si (KR)

(72) Inventors: Ji Won Jung, Yongin-si (KR); Guanghai Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 62 days.

(21) Appl. No.: 18/438,345

(22) Filed: Feb. 9, 2024

(65) Prior Publication Data

US 2024/0411269 A1  Dec. 12, 2024

(30) Foreign Application Priority Data

Jun. 8, 2023 (KR) .......................... 10-2023-0073589

(51) Int. Cl.
*G03H 1/00* (2006.01)
*G03H 1/02* (2006.01)

(52) U.S. Cl.
CPC ... *G03H 1/0005* (2013.01); *G03H 2001/0088* (2013.01); *G03H 2001/0224* (2013.01)

(58) Field of Classification Search
CPC ......... G03H 1/0005; G03H 2001/0088; G03H 2001/0224; G03H 2225/33;
(Continued)

(56) References Cited

U.S. PATENT DOCUMENTS 6,509,574 B2    1/2003  Yuan et al.
8,059,110 B2 *  11/2011 Whitehead ........... H04N 9/3102
                                                          345/204

(Continued)

FOREIGN PATENT DOCUMENTS

KR    1020210073456 A    6/2021
KR    1020210084230 A    7/2021
KR    1020210107220 A    9/2021

OTHER PUBLICATIONS

Kyohei Hayashi, et al., "Suppression of roll-off characteristics of organic light-emitting diodes by narrowing current injection/transport area to 50 nm", Applied Physics Letters, vol. 106, (2015), pp. 1-6.

(Continued)

*Primary Examiner* — Timothy R Newlin
(74) *Attorney, Agent, or Firm* — CANTOR COLBURN LLP

(57) ABSTRACT

A hologram display device includes at least one spatial light modulator displaying a holographic content image, at least one surface light source device generating image display light of a first resolution from behind the at least one spatial light modulator and providing the image display light of the first resolution to the spatial light modulator as background light, and at least one image transmission member defining a display path of the holographic content image. The at least one spatial light modulator generates a holographic content image of a second resolution by the image display light of the first resolution as the background light, and the at least one image transmission member defines a display path of a holographic content image of a third resolution in which the image display light of the first resolution and the holographic content image of the second resolution are mixed.

19 Claims, 20 Drawing Sheets

(58) Field of Classification Search
CPC .... G03H 2225/60; G03H 1/02; G03H 1/2294; G03H 1/22; G03H 1/26; G02F 1/133601; H10K 59/12; G02B 27/0172; G02B 2027/0174; G09G 3/003; G09G 3/3208; G09G 3/3426; G09G 2310/08
See application file for complete search history.

(56) References Cited

U.S. PATENT DOCUMENTS

| | | | | |
|---|---|---|---|---|
| 8,400,695 B2 * | 3/2013 | Kroll | | G03H 1/2294 359/9 |
| 2006/0291769 A1 | 12/2006 | Spoonhower et al. | | |
| 2009/0219591 A1 * | 9/2009 | Cable | | G03B 33/12 359/9 |
| 2009/0322738 A1 * | 12/2009 | Cable | | G03H 1/0808 345/419 |
| 2010/0014134 A1 * | 1/2010 | Cable | | G03H 1/2205 359/9 |
| 2012/0162968 A1 * | 6/2012 | Messmer | | H05B 45/10 362/97.1 |
| 2012/0287146 A1 * | 11/2012 | Brown Elliott | | G09G 3/3426 345/590 |
| 2013/0194644 A1 * | 8/2013 | Cable | | G03H 1/2294 359/9 |
| 2018/0173057 A1 * | 6/2018 | Choi | | G02F 1/133621 |
| 2019/0212700 A1 * | 7/2019 | An | | G02B 13/18 |
| 2020/0103825 A1 * | 4/2020 | Kim | | G02B 27/0103 |
| 2020/0409307 A1 * | 12/2020 | Chae | | G03H 1/0486 |
| 2021/0055691 A1 * | 2/2021 | Wengierow | | G02B 27/0172 |
| 2022/0179214 A1 * | 6/2022 | Lee | | G02B 6/0023 |
| 2023/0315015 A1 * | 10/2023 | Christmas | | G09G 3/002 |
| 2024/0155072 A1 * | 5/2024 | Abhishek | | H04N 7/147 |
| 2025/0028280 A1 * | 1/2025 | Hong | | G02B 27/0093 |

OTHER PUBLICATIONS

Matthew Hirsch, et al., "Tensor Displays", ISBN, vol. 978, Aug. 5-9, 2012, pp. 1.

* cited by examiner

FH(110)

FH(210)

HOLOGRAM DISPLAY DEVICE

This application claims priority to Korean Patent Application No. 10-2023-0073589, filed on Jun. 8, 2023, and all the benefits accruing therefrom under 35 U.S.C. § 119, the content of which in its entirety is herein incorporated by reference.

BACKGROUND

1. Field

The disclosure relates to a hologram display device.

2. Description of the Related Art

Recently, as electronic devices and display devices that may implement virtual reality ("VR") are developed, technologies that may realize augmented reality ("AR"), mixed reality ("MR"), and holographic images are also being researched as a next step of virtual reality.

Unlike virtual reality that is based on a completely virtual world, augmented reality is a display technology that further increases the effect of reality by superimposing virtual objects or image information on a real-world environment. Stereoscopic imaging technology using a hologram method may fundamentally avoid fatigue that occurs in a conventional stereoscopic method in which stereoscopic images are seen using binocular disparity. Therefore, the stereoscopic imaging technology using the hologram method is drawing a lot of attention as a next-generation stereoscopic imaging technology that should be ultimately reached.

In the case of a holographic image, since an actual image formed is directly seen with the eyes without using an optical illusion, a three dimensional ("3D") effect that is no different from seeing a real thing may be felt. Therefore, the holographic image has the advantage that even watching it for a long time does not cause fatigue.

A digital hologram method essentially employs a spatial light modulator, and the performance of the spatial light modulator acts as an important factor that determines the performance of a hologram. Recently, a liquid crystal display panel is being employed as a spatial light modulator, and the pixel size and pixel interval of the liquid crystal display panel act as important factors that determine the size and viewing angle of a holographic image in a hologram display device.

SUMMARY

Features of the disclosure provide a hologram display device capable of increasing the resolution and three dimensional ("3D") effect of a holographic image by modulating the resolution and 3D effect of a surface light source device that provides background light to a spatial light modulator.

Features of the disclosure also provide a hologram display device capable of generating image display light at a different step for each light-emitting area of a surface light source device and providing the image display light of different steps to a spatial light modulator as background light.

However, features of the disclosure are not restricted to the one set forth herein. The above and other features of the disclosure will become more apparent to one of ordinary skill in the art to which the disclosure pertains by referencing the detailed description of the disclosure given below.

In an embodiment of the disclosure, a hologram display device includes a spatial light modulator displaying a holographic content image, a surface light source device generating image display light of a first resolution from behind the spatial light modulator and providing the image display light of the first resolution to the spatial light modulator as background light, and an image transmission member defining a display path of the holographic content image, where the spatial light modulator generates a holographic content image of a second resolution by the image display light of the first resolution as the background light, and the image transmission member defines a display path of a holographic content image of a third resolution in which the image display light of the first resolution and the holographic content image of the second resolution are mixed.

In an embodiment, the surface light source device includes an organic light-emitting display unit generating the image display light of the first resolution as a surface light source, a first data processor extracting holographic content image data of the first resolution from holographic content image data input from the outside or converting the holographic content image data input from the outside into the holographic content image data of the first resolution, and an emission driving circuit converting the holographic content image data of the first resolution into an analog image signal and supplying the analog image signal to organic light-emitting pixels of the organic light-emitting display unit.

In an embodiment of the disclosure, a hologram display device includes a spatial light modulator displaying a holographic content image, a surface light source device generating image display light of a first resolution from behind the spatial light modulator and providing the image display light of the first resolution to the spatial light modulator as background light, and an image transmission member defining a display path of the holographic content image, where the spatial light modulator generates a holographic content image of a second resolution by the image display light of the first resolution as the background light, and the image transmission member defines a display path of a holographic content image of a third resolution in which the image display light of the first resolution and the holographic content image of the second resolution are mixed, where the first resolution is a resolution preset to be lower than the second resolution, and the third resolution is a mixture of the first resolution and the second resolution.

In an embodiment, the surface light source device generates the image display light of the first resolution as a surface light source by converting holographic content image data input from the outside into holographic content image data of the first resolution, converting the holographic content image data of the first resolution into an analog image signal, and supplying the analog image signal to organic light-emitting pixels of an organic light-emitting display unit.

A hologram display device in an embodiment of the disclosure may increase the resolution and 3D effect of a holographic image by modulating the resolution and 3D effect of a surface light source device that provides background light to a spatial light modulator.

In addition, a hologram display device in an embodiment of the disclosure may generate image display light at a different step for each light-emitting area of a surface light source device and provide the image display light of different steps to a spatial light modulator as background light, thereby further improving a 3D effect of a holographic image.

However, the effects of the disclosure are not restricted to the one set forth herein. The above and other effects of the disclosure will become more apparent to one of daily skill in the art to which the disclosure pertains by referencing the claims.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

The disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

The term such as "part" or "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Each of the features of the various embodiments of the disclosure may be combined or combined with each other, in part or in whole, and technically various interlocking and driving are possible. Each embodiment may be implemented independently of each other or may be implemented together in an association.

Hereinafter, illustrative embodiments will be described in detail with reference to the accompanying drawings.

Figure 1:
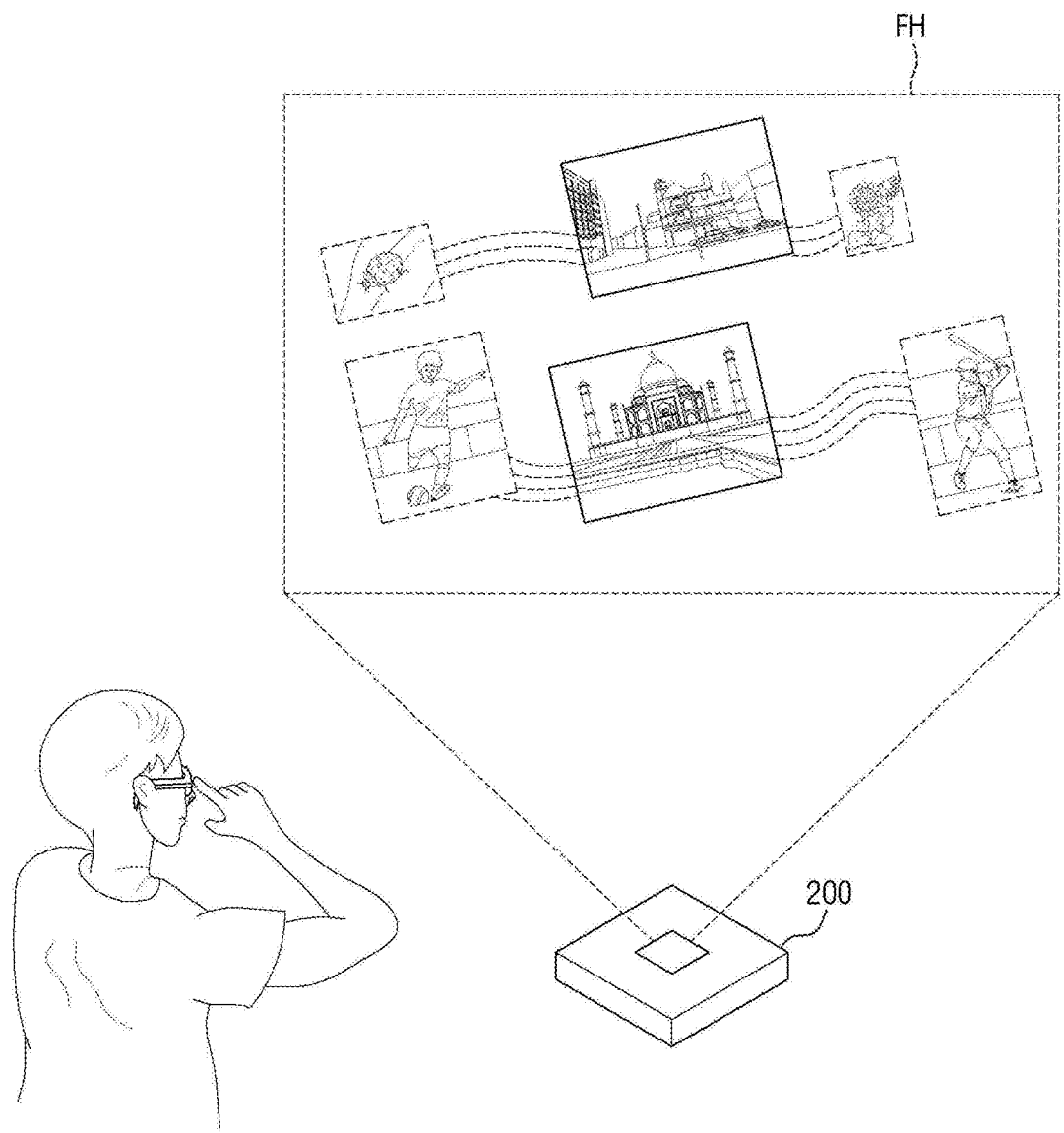
FIG. 1 illustrates an embodiment of utilizing a projector-type hologram display device according to the disclosure.
Figure 2:
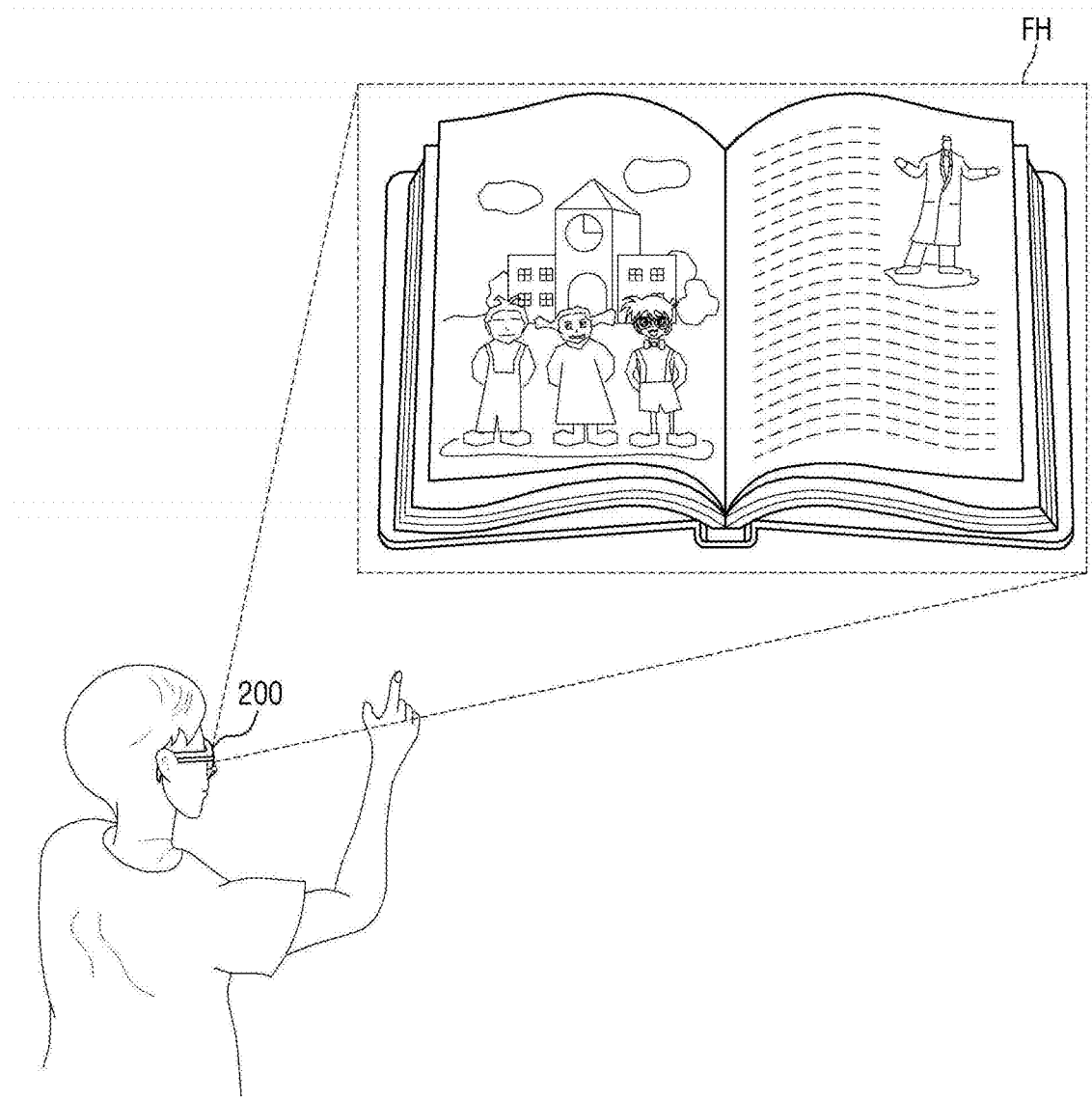
FIG. 2 illustrates an embodiment of utilizing a glasses-type hologram display device according to the disclosure.

FIG. 1 illustrates an embodiment of utilizing a projector-type hologram display device according to the disclosure. FIG. 2 illustrates an embodiment of utilizing a glasses-type hologram display device according to the disclosure.

Referring to FIGS. 1 and 2, a hologram display device 200 in an embodiment may be formed as a projector type that may be easily carried by a user or may be disposed (e.g., mounted) or assembled in structures in a predetermined space such as a ceiling or a wall surface.

In addition, the hologram display device 200 in the embodiment may be unitary with a glasses-type frame that may be easily carried and worn or taken off by a user or may be disposed (e.g., mounted) or assembled in the glasses-type frame.

The hologram display device 200 displays and provides a holographic content image FH on a predetermined space through a three dimensional ("3D") lens or sheet, so that the holographic content image FH may be recognized in a real space seen by a user's eyes. The holographic content image FH may include two-dimensional ("2D") or 3D holographic image content, which is a combination of graphic images, camera-photographed images and text images, and sound content.

Figure 3:
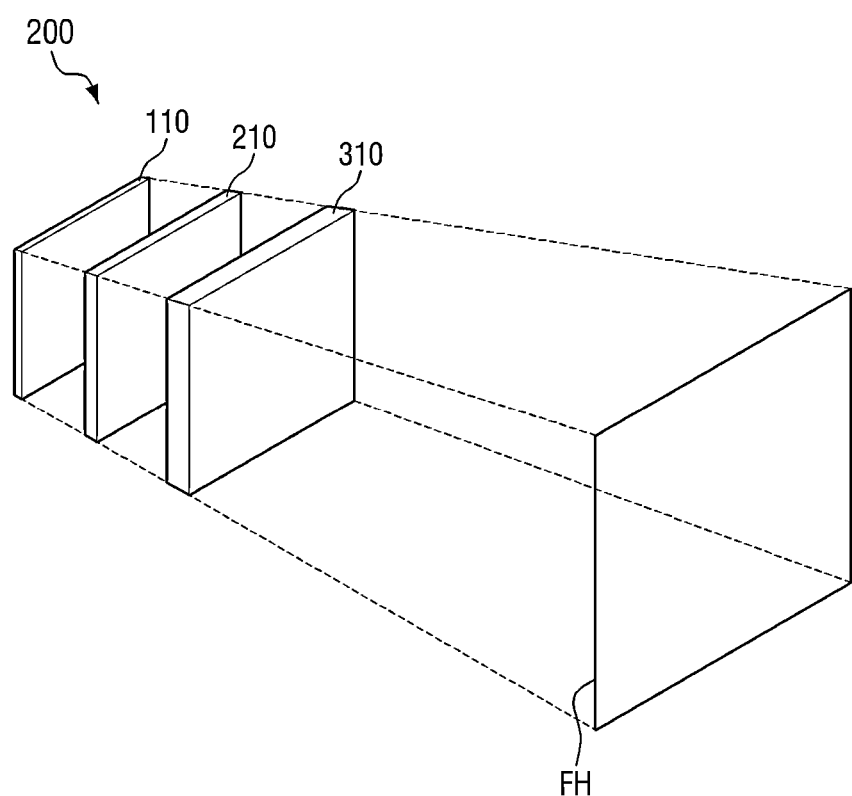
FIG. 3 is an exploded perspective view schematically illustrating the configuration of the hologram display device illustrated in FIG. 1 or 2.

FIG. 3 is an exploded perspective view schematically illustrating the configuration of the hologram display device 200 illustrated in FIG. 1 or 2.

Referring to FIG. 3, the hologram display device 200 includes at least one spatial light modulator 210, at least one surface light source device 110, and at least one image transmission member 310.

The at least one surface light source device 110 is disposed behind the spatial light modulator 210 to provide background light as a backlight to a rear surface of the spatial light modulator 210.

The surface light source device 110 may include an organic light-emitting display device ("OLED"), an inorganic electroluminescent ("EL") display device, a quantum dot light-emitting display device ("QED"), a cathode ray tube ("CRT") display device, a micro-light-emitting diode ("LED") display device, a nano-LED display device, or a liquid crystal display ("LCD") device.

A case where an OLED is applied as the surface light source device 110 will be described below as an example. However, the disclosure is not limited to the OLED, and other display devices listed above or known in the art may also be applied within the scope sharing the technical spirit.

The surface light source device 110 applied as an OLED may be formed to have a different resolution from that of the at least one spatial light modulator 210. In particular, the surface light source device 110 may be formed to have a lower resolution than the at least one spatial light modulator 210.

The surface light source device 110 receives holographic content image data from the outside and arranges the holographic content image data according to a preset first resolution. Then, the holographic content image data of the first resolution is converted into an analog image signal and displayed on emission areas of an organic light-emitting display surface.

The holographic content image display light of the first resolution displayed on the organic light-emitting display surface of the surface light source device 110, that is, the emission areas of the surface light source device 110 is provided to the rear surface of the spatial light modulator 210 as a backlight, that is, background light.

The spatial light modulator 210 generates a holographic content image according to the holographic content image data from the outside and supplies the holographic content image to the image transmission member 310 in front of the spatial light modulator 210, so that the holographic content image is displayed in an image display direction and space of the image transmission member 310.

The spatial light modulator 210 may include an LCD that displays a holographic content image of a second resolution on a front surface by the background light of the first resolution provided from the surface light source device 110 disposed behind the spatial light modulator 210.

A case where an LCD is applied as the spatial light modulator 210 will be described below as an example. However, the disclosure is not limited to the LCD, and other display devices listed above or known in the art may also be applied within the scope sharing the technical spirit.

The spatial light modulator 210 applied as an LCD may be formed to have the same resolution as or a different resolution from that of the at least one surface light source device 110. However, in an embodiment, the spatial light modulator 210 may be formed to have a higher resolution than the at least one surface light source device 110.

The spatial light modulator 210 receives holographic content image data input from the outside and arranges the holographic content image data according to a preset second resolution. Then, the holographic content image data of the second resolution is converted into an analog image signal and displayed on an image display surface on which a plurality of pixels are arranged. The second resolution of the spatial light modulator 210 is set to be different from the first resolution of the surface light source device 110, particularly, set to be higher than the first resolution of the surface light source device 110.

Accordingly, the spatial light modulator 210 generates a holographic content image of the second resolution higher than the first resolution by the background light of the first resolution provided from the at least one surface light source device 110 behind the spatial light modulator 210 and displays the generated holographic content image on its front surface.

The at least one image transmission member 310 transmits a holographic content image of a third resolution, in which the background light of the first resolution and the holographic content image of the second resolution are mixed, through a preset light path to direct and provide the holographic content image in a preset image display direction.

Specifically, the image transmission member 310 defines a display path (or light path) of a holographic content image FH so that the holographic content image FH of the third resolution may be displayed on a preset space or display surface.

The image transmission member 310 may include at least one optical member from among an optical waveguide (e.g., a prism), a diffusion lens, and a focusing lens. Therefore, the holographic content image FH displayed through the at least one spatial light modulator 210 is directed to a predetermined space through the optical waveguide, the diffusion lens and at least one focusing lens and recognized as the holographic content image FH of the third resolution in real space. The holographic content image FH displayed as a hologram type by the image transmission member 310 may include 2D or 3D holographic image content, which is a combination of graphic images, camera-photographed images and text images, and sound content.

Figure 4:
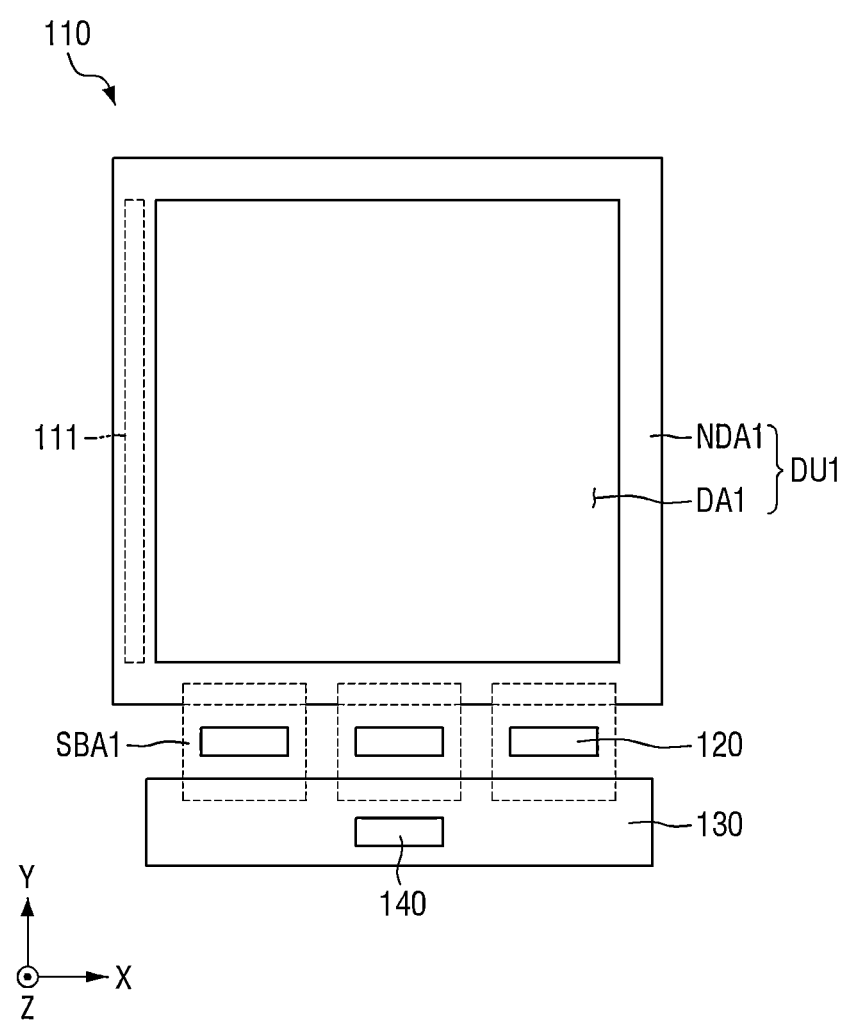
FIG. 4 is a detailed plan view of a surface light source device illustrated in FIG. 3.

FIG. 4 is a detailed plan view of the surface light source device 110 illustrated in FIG. 3.

Referring to FIG. 4, the at least one surface light source device 110 is formed to serve as a light source that provides background light to the rear surface of the at least one spatial light modulator 210.

The surface light source device 110 may have a quadrangular shape such as a rectangular shape and a square shape, a circular shape, or an elliptical shape in a plan view. In an embodiment, when the spatial light modulator 210 is formed in a rectangular shape, the surface light source device 110 may have a rectangular shape corresponding to the shape of the spatial light modulator 210 with long sides disposed in a horizontal direction, for example. However, the disclosure is not limited thereto. The long sides may also be disposed in a vertical direction, or the surface light source device 110 may also be rotatably installed so that its long sides may be variably disposed in the horizontal or vertical direction. The surface light source device 110 may also be formed in a circular shape in a plan view together with the spatial light modulator 210.

Referring to FIG. 4, the at least one surface light source device 110 includes a surface light-emitting unit DU1 which displays background light as a surface light source, emission driving circuits 120 which drive light-emitting pixels of the surface light-emitting unit DU1, and a first data processor 140 which supplies holographic content image data to the emission driving circuits 120.

Specifically, the at least one surface light source device 110 includes the surface light-emitting unit DU1 which displays background light as a surface light source. Here, the surface light-emitting unit DU1 may include a plurality of light-emitting pixels and may emit background light, which is a surface light source, through the light-emitting pixels. The light-emitting pixels in the surface light-emitting unit DU1 are formed and arranged to correspond to a preset first resolution.

The first data processor 140 extracts holographic content image data of the first resolution from holographic content image data input from the outside or converts the holographic content image data input from the outside into the holographic content image data of the preset first resolution. Then, the holographic content image data of the first resolution is transmitted to the emission driving circuits 120 of the surface light source device 110.

The emission driving circuits 120 of the surface light source device 110 may output data signals and voltages for driving the light-emitting pixels of the surface light-emitting unit DU1. Specifically, the emission driving circuits 120 receive holographic content image data from the first data processor 140 such as a graphic card and arrange the holographic content image data according to the preset first resolution. Then, the holographic content image data of the first resolution is converted into an analog image signal and supplied to the light-emitting pixels arranged on an organic light-emitting display surface DA1 of the surface light-emitting unit DU1.

Figure 5:
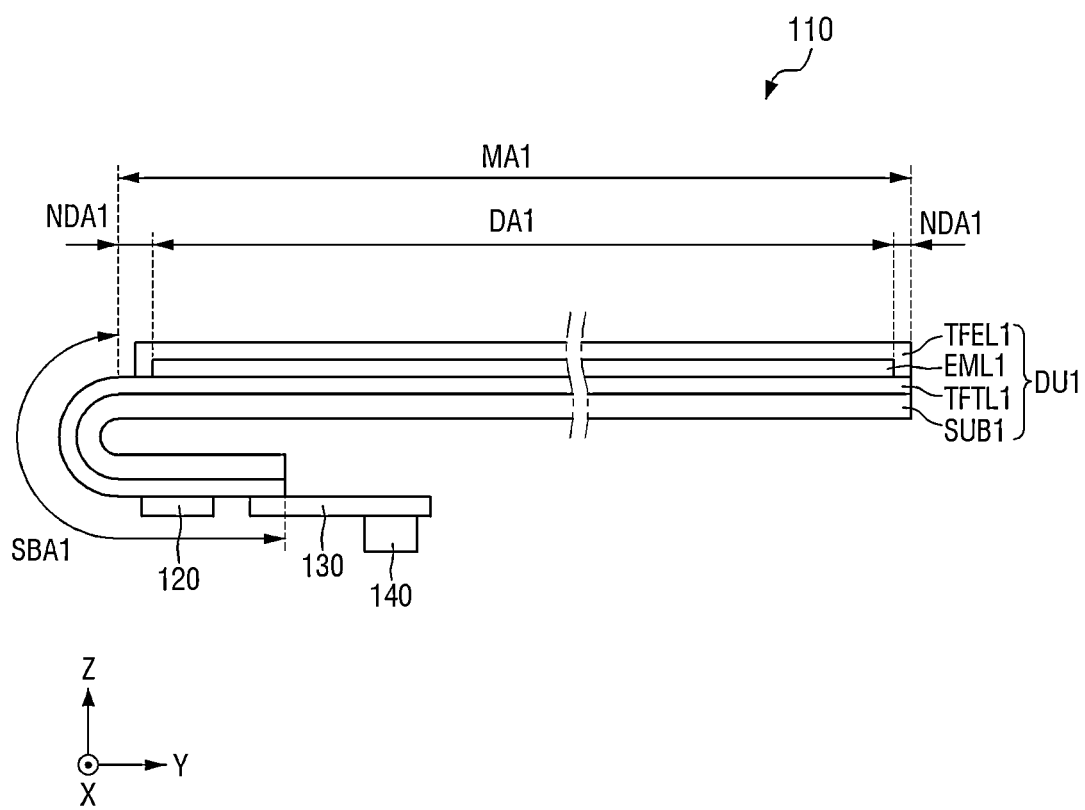
FIG. 5 is a side cross-sectional view illustrating the cross-sectional structure of the surface light source device illustrated in FIG. 4.

FIG. 5 is a side cross-sectional view illustrating the cross-sectional structure of the surface light source device 110 illustrated in FIG. 4.

Referring to FIGS. 4 and 5, the surface light-emitting unit DU1 may be divided into a first main area MA1 and first sub-areas SBA1. The first main area MA1 may include the organic light-emitting display surface DA1 on which a plurality of light-emitting pixels performing surface emission are arranged and a first non-display area NDA1 disposed around the organic light-emitting display surface DA1. Light emitted from respective emission areas or opening areas of the light-emitting pixels may be displayed on the organic light-emitting display surface DA1 as background light. To this end, the light-emitting pixels of the organic light-emitting display surface DA1 may include light-emitting pixel circuits including switching elements, a pixel defining layer defining the emission areas or the opening areas, and self-light-emitting elements.

The first non-display area NDA1 may be an area outside the organic light-emitting display surface DA1. The first non-display area NDA1 may be defined as an edge area of the first main area MA1. The first non-display area NDA1 may include a gate driver 111 supplying gate signals to gate lines and fan-out lines (not illustrated) connecting the emission driving circuits 120 and the organic light-emitting display surface DA1.

The first sub-areas SBA1 may extend from a side of the first main area MA1. The first sub-areas SBA1 may include a flexible material that may be bent, folded, or rolled. In an embodiment, when the first sub-areas SBA1 are bent, they may be overlapped by the first main area MA1 in a thickness direction (Z-axis direction), for example. Each of the first sub-areas SBA1 may include an emission driving circuit 120 and a pad unit connected to a first circuit board 130. Optionally, the first sub-areas SBA1 may be omitted, and the emission driving circuits 120 and the pad units may be disposed in the first non-display area NDA1.

At least one emission driving circuit 120 may be formed as an integrated circuit and disposed (e.g., mounted) in the first non-display area NDA1 by a chip on glass ("COG") method, a chip on plastic ("COP") method, or an ultrasonic bonding method. In an embodiment, the emission driving circuit 120 may be disposed in each of the first sub-areas SBA1 and may be overlapped by the first main area MA1 in the thickness direction (Z-axis direction) by the bending of the first sub-area SBA1, for example. In another embodiment, the emission driving circuit 120 may be disposed (e.g., mounted) on the first circuit board 130.

The first circuit board 130 may be attached onto the pad units of the first non-display area NDA1 using an anisotropic conductive film ("ACF"). Lead lines of the first circuit board 130 may be electrically connected to the pad units of the first non-display area NDA1. The first circuit board 130 may be a flexible printed circuit board, a printed circuit board, or a flexible film such as a chip on film.

A first substrate SUB1 of the surface light-emitting unit DU1 illustrated in FIG. 5 may be a base substrate or a base member. The first substrate SUB1 may be a flexible substrate that may be bent, folded, or rolled. In an embodiment, the first substrate SUB1 may include a glass material or a metal material, for example. However, the disclosure is not limited thereto. In another embodiment, the first substrate SUB1 may include polymer resin such as polyimide ("PI").

A first thin-film transistor layer TFTL1 may be disposed on the first substrate SUB1. The first thin-film transistor layer TFTL1 may include a plurality of thin-film transistors constituting light-emitting pixel circuits of light-emitting pixels. The first thin-film transistor layer TFTL1 may further include gate lines, data lines, power lines, gate control lines, fan-out lines connecting the emission driving circuits 120 and the data lines, and lead lines connecting the emission driving circuits 120 and the pad units. When the first gate driver 111 is formed on a side of the first non-display area NDA1 of the surface light-emitting unit DU1, it may also include thin-film transistors.

The first thin-film transistor layer TFTL1 may be disposed on the organic light-emitting display surface DA1, the first non-display area NDA1, and the first sub-areas SBA1. The thin-film transistors of the pixels, the gate lines, the data lines, and the power lines of the first thin-film transistor layer TFTL1 may be disposed on the organic light-emitting display surface DA1. The gate control lines and the fan-out lines of the first thin-film transistor layer TFTL1 may be disposed in the first non-display area NDA1. The lead lines of the first thin-film transistor layer TFTL1 may be disposed in the first sub-areas SBA1.

A first light-emitting element layer EML1 may be disposed on the first thin-film transistor layer TFTL1. The first light-emitting element layer EML1 may include a plurality of light-emitting elements, each including a first electrode, a light-emitting layer and a second electrode sequentially stacked to emit light, and a pixel defining layer defining the pixels. The light-emitting elements of the first light-emitting element layer EML1 may be disposed on the organic light-emitting display surface DA1.

A first encapsulation layer TFEL1 may cover upper and side surfaces of the first light-emitting element layer EML1 and may protect the first light-emitting element layer EML1. The first encapsulation layer TFEL1 may include at least one inorganic layer and at least one organic layer to encapsulate the first light-emitting element layer EML1.

Figure 6:
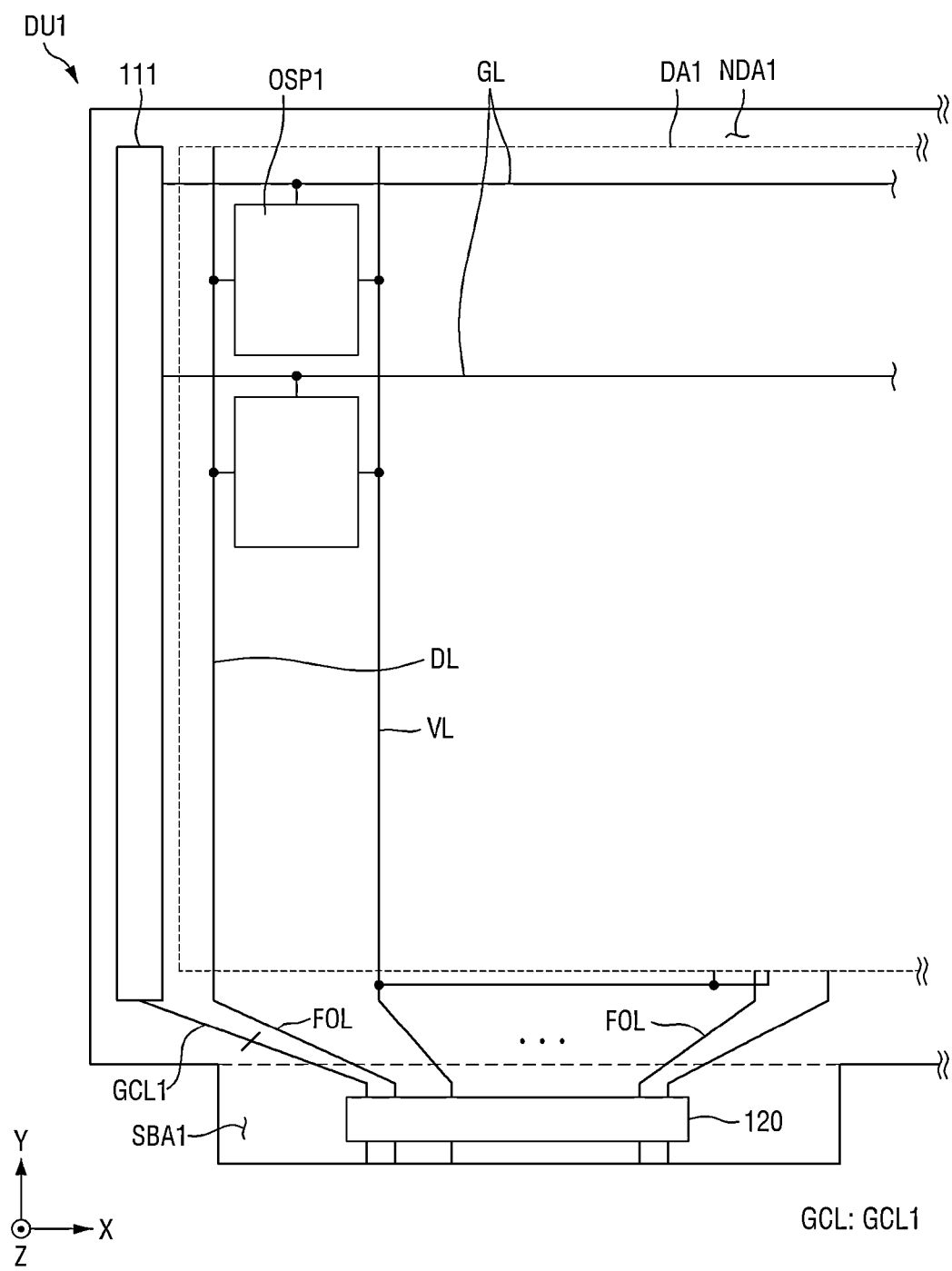
FIG. 6 is a plan view schematically illustrating the structure of a surface light-emitting unit of the surface light source device illustrated in FIGS. 4 and 5.

FIG. 6 is a plan view schematically illustrating the structure of the surface light-emitting unit DU of the surface light source device 110 illustrated in FIGS. 4 and 5.

The organic light-emitting display surface DA1 is an area that displays background light through surface light emission and may be defined as a central area of the surface light-emitting unit DU1. The organic light-emitting display surface DA1 may include a plurality of light-emitting pixels OSP (refer to FIG. 15), a plurality of gate lines GL, a plurality of data lines DL, and a plurality of power lines VL. Each of the light-emitting pixels OSP may be defined as a minimum unit that emits light.

The gate lines GL may supply gate signals received from the first gate driver 111 to the light-emitting pixels OSP. The gate lines GL may extend in an X-axis direction and may be spaced apart from each other in a Y-axis direction crossing the X-axis direction.

The data lines DL may supply image data voltages received from an emission driving circuit 120 to the light-emitting pixels OSP. The data lines DL may extend in the Y-axis direction and may be spaced apart from each other in the X-axis direction.

The power lines VL may supply a power supply voltage received from the emission driving circuit 120 to the light-emitting pixels OSP. Here, the power supply voltage may be at least one of a driving voltage, an initialization voltage, and a reference voltage. The power lines VL may extend in the Y-axis direction and may be spaced apart from each other in the X-axis direction.

The first non-display area NDA1 may include the first gate driver 111, fan-out lines FOL, and gate control lines GCL. The first gate driver 111 may generate a plurality of gate signals based on a gate control signal and may sequentially supply the gate signals to the gate lines GL according to a set order.

The fan-out lines FOL may extend from the emission driving circuit 120 to the organic light-emitting display surface DA1. The fan-out lines FOL may supply data voltages received from the emission driving circuit 120 to the data lines DL.

A first gate control line GCL1 may extend from the emission driving circuit 120 to the first gate driver 111. The first gate control line GCL1 may supply a gate control signal received from the emission driving circuit 120 to the first gate driver 111.

The emission driving circuit 120 may output control signals and data voltages for driving the light-emitting pixels OSP of the organic light-emitting display surface DA1 to the fan-out lines FOL. The emission driving circuit 120 may supply image data voltages to the data lines DL through the fan-out lines FOL. The image data voltages may be supplied to the light-emitting pixels OSP and may determine luminances of the light-emitting pixels OSP. The emission driving circuit 120 may supply a gate control signal to the first gate driver 111 through the gate control lines GCL.

Figure 7A:
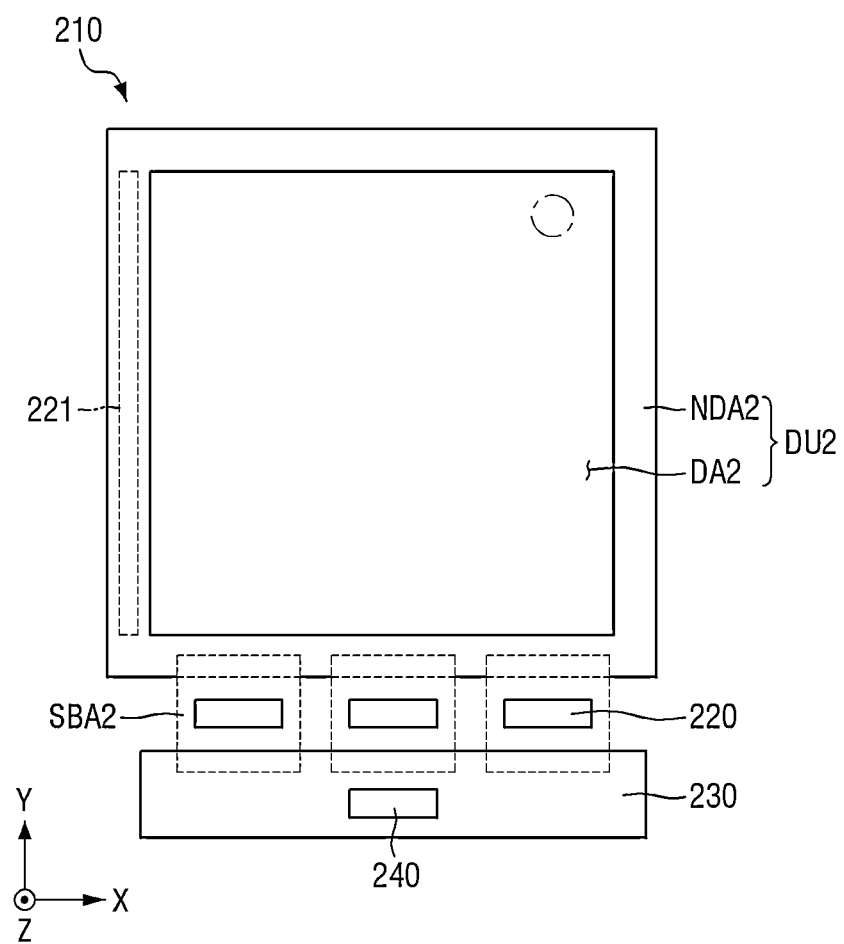
FIG. 7A is a detailed plan view of a spatial light modulator illustrated in FIG. 3.
Figure 7B:
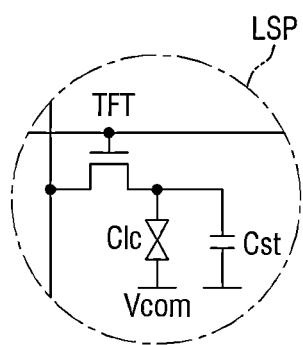
FIG. 7B is an enlarged view of a dot-dashed circular portion of FIG. 7A.

FIG. 7A is a detailed plan view of the spatial light modulator 210 illustrated in FIG. 3, and FIG. 7B is an enlarged view of a dot-dashed circular portion of FIG. 7A.

Referring to FIG. 7A, the spatial light modulator 210 serves as a hologram display device that displays a holographic content image on the front surface using background light provided from the surface light source device 110 disposed behind the spatial light modulator 210.

The spatial light modulator 210 may be formed in the same planar shape as the surface light source device 110 that provides background light as a backlight and may have a quadrangular shape such as a rectangular shape and a square shape, a circular shape, or an elliptical shape in a plan view. In an embodiment, when the surface light source device 110 is formed in a rectangular shape, the spatial light modulator 210 may have a rectangular shape corresponding to the shape of the surface light source device 110 with long sides disposed in the horizontal direction, for example. However, the disclosure is not limited thereto. The long sides may also be disposed in the vertical direction, or the spatial light modulator 210 may also be rotatably installed so that its long sides may be variably disposed in the horizontal or vertical direction. The spatial light modulator 210 may also be formed in a circular shape in a plan view, like the surface light source device 110.

Referring to FIG. 7A, the spatial light modulator 210 includes a liquid crystal image display unit DU2 and a second data processor 240 disposed on a second circuit board 230.

The liquid crystal image display unit DU2 displays a holographic content image on a front surface by background light provided from the surface light source device 110 disposed behind the spatial light modulator 210. The liquid crystal image display unit DU2 includes a plurality of liquid crystal pixels and displays a holographic content image through the liquid crystal pixels. The liquid crystal pixels in the liquid crystal image display unit DU2 are formed and arranged to correspond to a preset second resolution.

The second data processor 240 supplies holographic content image data to display driving circuits 220 which drive the liquid crystal pixels of the liquid crystal image display unit DU2. In an embodiment, the display driving circuits 220 may be disposed in second sub-areas SBA2.

The second data processor 240 extracts holographic content image data of the second resolution from holographic content image data input from the outside or converts the holographic content image data input from the outside into the holographic content image data of the preset second resolution. Then, the holographic content image data of the second resolution is transmitted to the display driving circuits 220 of the spatial light modulator 210.

The display driving circuits 220 of the spatial light modulator 210 may output data signals and voltages for driving the liquid crystal pixels of the liquid crystal image display unit DU2. Specifically, the display driving circuits 220 receive holographic content image data from the second data processor 240 such as a graphic card and arrange the holographic content image data according to the preset second resolution. Then, the holographic content image data of the second resolution is converted into an analog image signal and supplied to the liquid crystal pixels arranged on an image display surface DA2 of the liquid crystal image display unit DU2.

Figure 8:
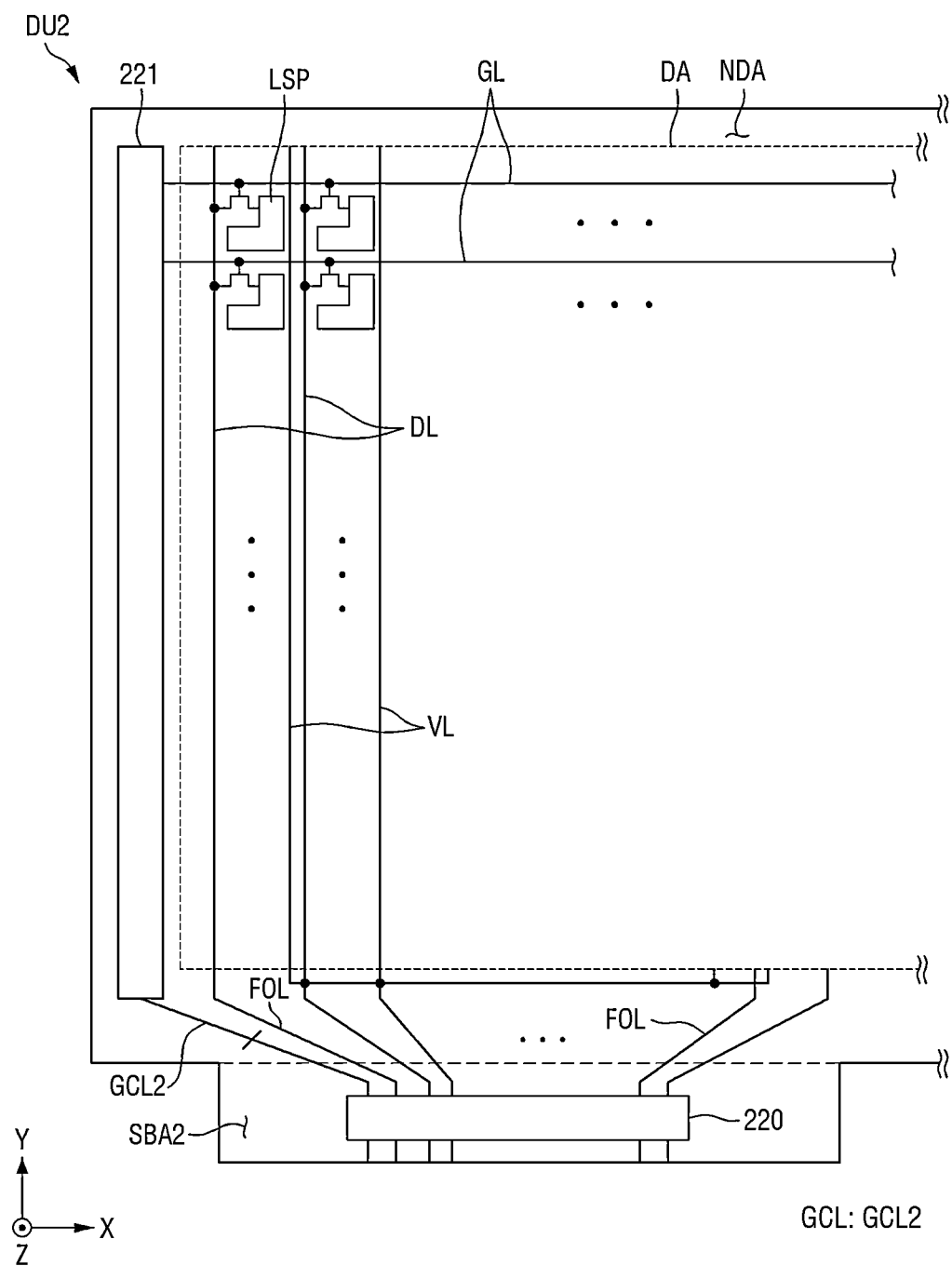
FIG. 8 is a plan view schematically illustrating the structure of a liquid crystal image display unit of the spatial light modulator illustrated in FIG. 7A.

FIG. 8 is a plan view schematically illustrating the structure of the liquid crystal image display unit DU2 of the spatial light modulator 210 illustrated in FIG. 7A.

Referring to FIGS. 7A and 8, the image display surface DA2 is an image display area that displays a holographic content image and may be defined as a central area of the liquid crystal image display unit DU2. The image display surface DA2 may include a plurality of liquid crystal pixels LSP, a plurality of gate lines GL, a plurality of data lines DL, and a plurality of power lines VL. Each of the liquid crystal pixels LSP may be defined as a minimum unit that displays a holographic content image by passing background light therethrough.

Each of the liquid crystal pixels LSP includes a data lines DL, a gate lines GL crossing the data lines DL, a thin-film transistors TFT formed at an intersection of the data line DL and the gate line GL, a pixel electrode connected to the thin-film transistor TFT, a liquid crystal cell Clc formed in an area between the pixel electrode and a common electrode, and a storage capacitor Cst formed in parallel to the liquid crystal cell Clc, as illustrated in FIG. 7B. The liquid crystal cell Clc is driven by a difference voltage between a data voltage of the pixel electrode and a common voltage Vcom of the common electrode and an electric field according to the difference voltage. The liquid crystal cell Clc realizes image display light by diffracting and passing background light through the difference voltage between the data voltage and the common voltage Vcom and the electric field according to the difference voltage. A color filter may be disposed on each liquid crystal pixel LSP to display a color image.

The gate lines GL may supply gate signals received from a second gate driver 221 to the liquid crystal pixels LSP. The gate lines GL may extend in the X-axis direction and may be spaced apart from each other in the Y-axis direction crossing the X-axis direction.

The data lines DL may supply image data voltages received from a display driving circuit 220 to the liquid crystal pixels LSP. The data lines DL may extend in the Y-axis direction and may be spaced apart from each other in the X-axis direction.

The power lines VL may supply a power supply voltage such as the common voltage Vcom received from the display driving circuit 220 to the liquid crystal pixels LSP.

A second non-display area NDA2 may include the second gate driver 221, fan-out lines FOL, and gate control lines GCL. The second gate driver 221 may generate a plurality of gate signals based on a gate control signal and may sequentially supply the gate signals to the gate lines GL according to a set order.

The fan-out lines FOL may extend from the display driving circuit 220 to the image display surface DA2. The fan-out lines FOL may supply data voltages received from the display driving circuit 220 to the data lines DL.

A second gate control line GCL2 may extend from the display driving circuit 220 to the second gate driver 221. The second gate control line GCL2 may supply a gate control signal received from the display driving circuit 220 to the second gate driver 221.

The display driving circuit 220 may output control signals and image data voltages for driving the liquid crystal pixels LSP of the image display surface DA2 to the fan-out lines FOL. The display driving circuit 220 may supply image data voltages to the data lines DL through the fan-out lines FOL. The image data voltages may be supplied to the liquid crystal pixels LSP and may determine luminances of the liquid crystal pixels LSP. The display driving circuit 220 may supply a gate control signal to the second gate driver 221 through the gate control lines GCL.

Figure 9:
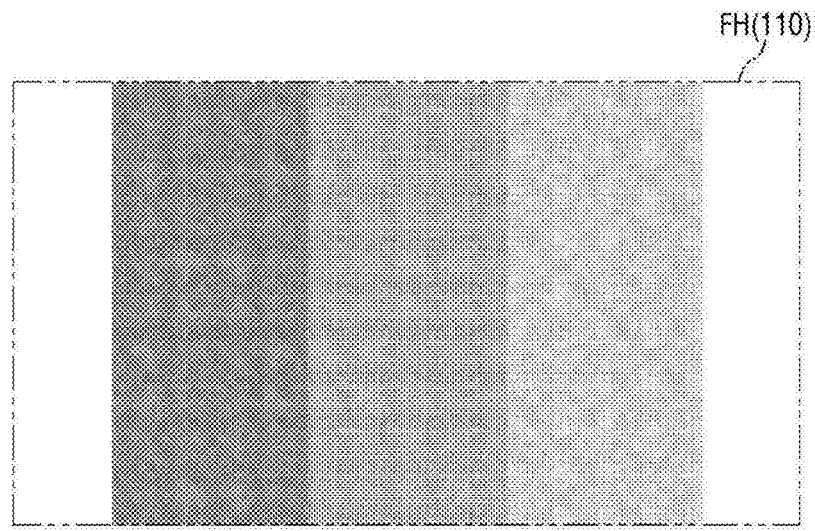
FIG. 9 illustrates an embodiment of background light and background light display resolution of a surface light source device.

FIG. 9 illustrates background light and background light display resolution of a surface light source device 110.

Referring to FIG. 9, a first data processor 140 of the surface light source device 110 may convert holographic content image data input from the outside into holographic content image data of a preset first resolution. Then, the holographic content image data of the first resolution is transmitted to an emission driving circuit 120 of the surface light source device 110.

The emission driving circuit 120 of the surface light source device 110 receives the holographic content image data of the first resolution from the first data processor 140 and arranges the holographic content image data according to the first resolution. Then, the holographic content image data of the first resolution is converted into an analog image signal and supplied to light-emitting pixels arranged on an organic light-emitting display surface DA1 of a surface light-emitting unit DU1. An image FH (110) according to the first resolution is displayed on the organic light-emitting display surface DA1 of the surface light-emitting unit DU1, and image display light according to the first resolution is provided to the spatial light modulator 210 as a surface light source and as background light.

Figure 10:
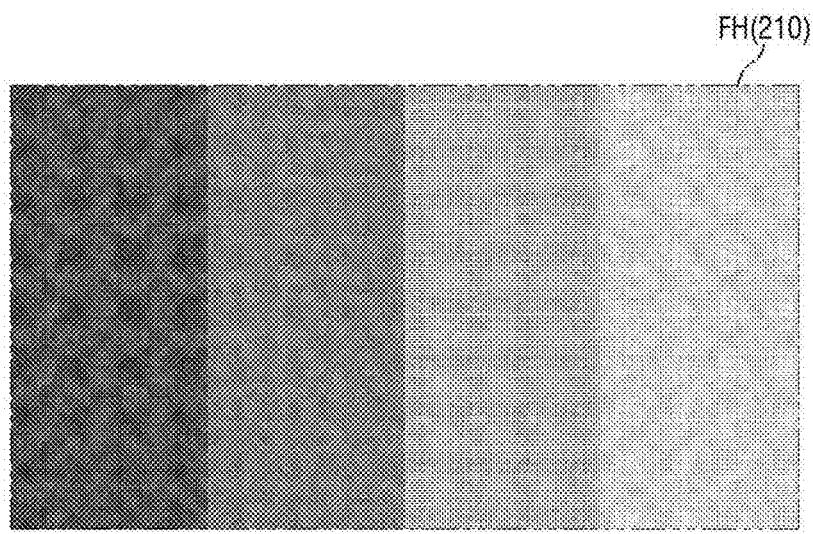
FIG. 10 illustrates an embodiment of a display image and image display resolution of a spatial light modulator.

FIG. 10 illustrates a display image and image display resolution of a spatial light modulator 210.

Referring to FIG. 10, a second data processor 240 of the spatial light modulator 210 converts holographic content image data input from the outside into holographic content image data of a preset second resolution. Then, the holographic content image data of the second resolution is transmitted to a display driving circuit 220 of the spatial light modulator 210.

As described above, the second resolution of the spatial light modulator 210 may be set to be different from the first resolution of the surface light source device 110. That is, the second resolution of the spatial light modulator 210 may be set to be higher than the first resolution of the surface light source device 110.

The display driving circuit 220 of the spatial light modulator 210 receives the holographic content image data of the second resolution from the second data processor 240 and arranges the holographic content image data according to the preset second resolution. Then, the holographic content image data of the second resolution is converted into an analog image signal and supplied to liquid crystal pixels arranged on an image display surface DA2 of a liquid crystal image display unit DU2. Accordingly, the spatial light modulator 210 generates a holographic content image FH (210) of the second resolution higher than the first resolution by the background light of the first resolution provided from the surface light source device 110 and displays the holographic content image FH on a front surface.

Figure 11:
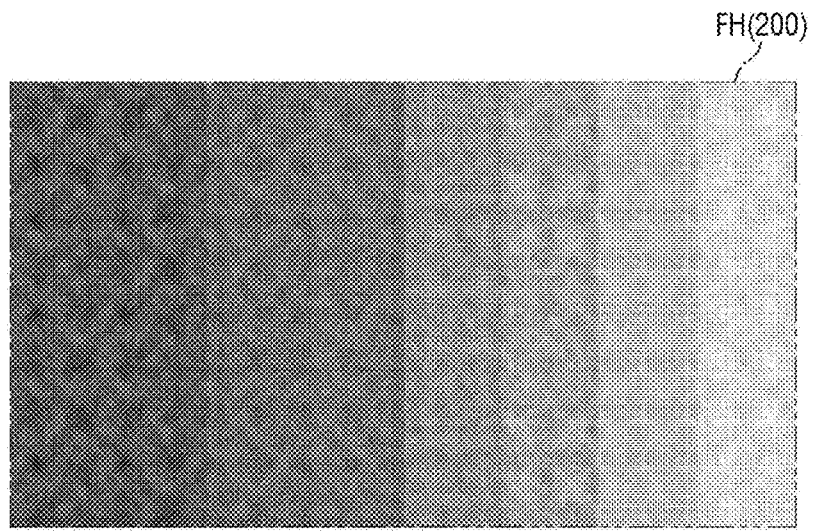
FIG. 11 illustrates an embodiment of a holographic image and resolution displayed through a hologram display device.

FIG. 11 illustrates a holographic image and resolution displayed through a hologram display device.

Referring to FIG. 11, the background light of the first resolution provided from the surface light source device 110 and the holographic content image of the second resolution according to the spatial light modulator 210 are mixed so that a holographic content image FH (200) of a third resolution is displayed on the front surface of the spatial light modulator 210.

The holographic content image FH (200) of the third resolution is supplied to an image transmission member 310, and the image transmission member 310 forms a display path (or light path) of the holographic content image FH so that the holographic content image FH of the third resolution may be displayed on a preset space or display surface. Accordingly, the holographic content image FH (210) displayed through at least one spatial light modulator 210 is directed to a predetermined space through an optical waveguide, a diffusion lens and at least one focusing lens and recognized as the holographic content image FH (200) in real space.

Figure 12:
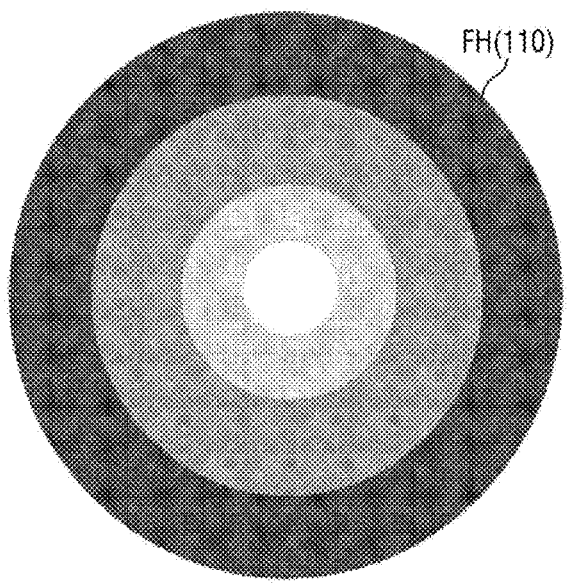
FIG. 12 illustrates an embodiment of background light and background light display resolution of a surface light source device.
Figure 13:
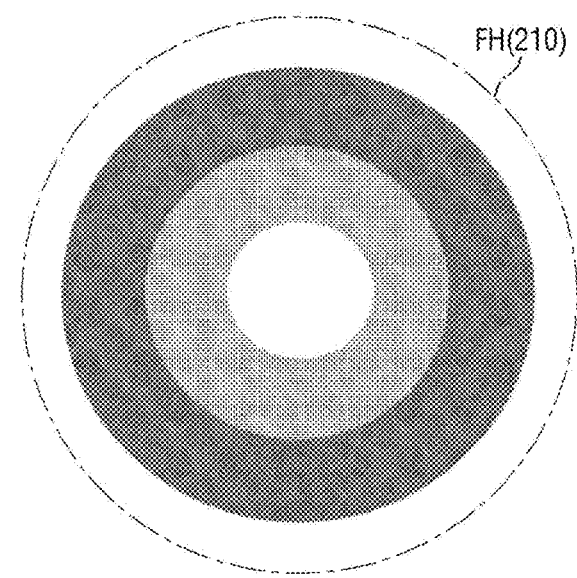
FIG. 13 illustrates an embodiment of a display image and image display resolution of a spatial light modulator.

FIG. 12 illustrates background light and background light display resolution of a surface light source device 110. FIG. 13 illustrates a display image and image display resolution of a spatial light modulator 210.

Referring to FIGS. 12 and 13, an emission driving circuit 120 of the surface light source device 110 receives holographic content image data of a first resolution from a first data processor 140 and arranges the holographic content image data according to the first resolution. Then, the holographic content image data of the first resolution is converted into an analog image signal and supplied to light-emitting pixels arranged on an organic light-emitting display surface DA1 of a surface light-emitting unit DU1.

An image FH (110) according to the first resolution is displayed on the organic light-emitting display surface DA1 of the surface light-emitting unit DU1, and image display light according to the first resolution is provided to the spatial light modulator 210 as a surface light source and as background light.

A display driving circuit 220 of the spatial light modulator 210 receives holographic content image data of a second resolution from a second data processor 240 and arranges the holographic content image data according to the preset second resolution. Then, the holographic content image data of the second resolution is converted into an analog image signal and supplied to liquid crystal pixels arranged on an image display surface DA2 of a liquid crystal image display unit DU2.

The spatial light modulator 210 generates a holographic content image FH (210) of the second resolution higher than the first resolution by the background light of the first resolution provided from the surface light source device 110 and displays the holographic content image FH (210) on a front surface.

Figure 14:
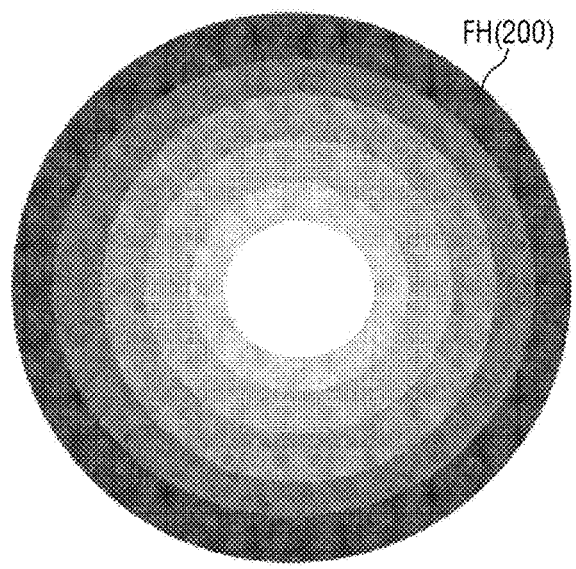
FIG. 14 illustrates an embodiment of a holographic image and resolution displayed through a hologram display device.

FIG. 14 illustrates a holographic image and resolution displayed through a hologram display device.

As illustrated in FIG. 14, the background light of the first resolution provided from the surface light source device 110 and the holographic content image FH (210) of the second resolution according to the spatial light modulator 210 are mixed so that a holographic content image FH (200) of a third resolution is displayed on the front surface of the spatial light modulator 210.

The holographic content image FH (200) of the third resolution is supplied to an image transmission member 310, and the image transmission member 310 defines a display path (or light path) of the holographic content image FH (200) so that the holographic content image FH of the third resolution may be displayed on a preset space or display surface.

Figure 15:
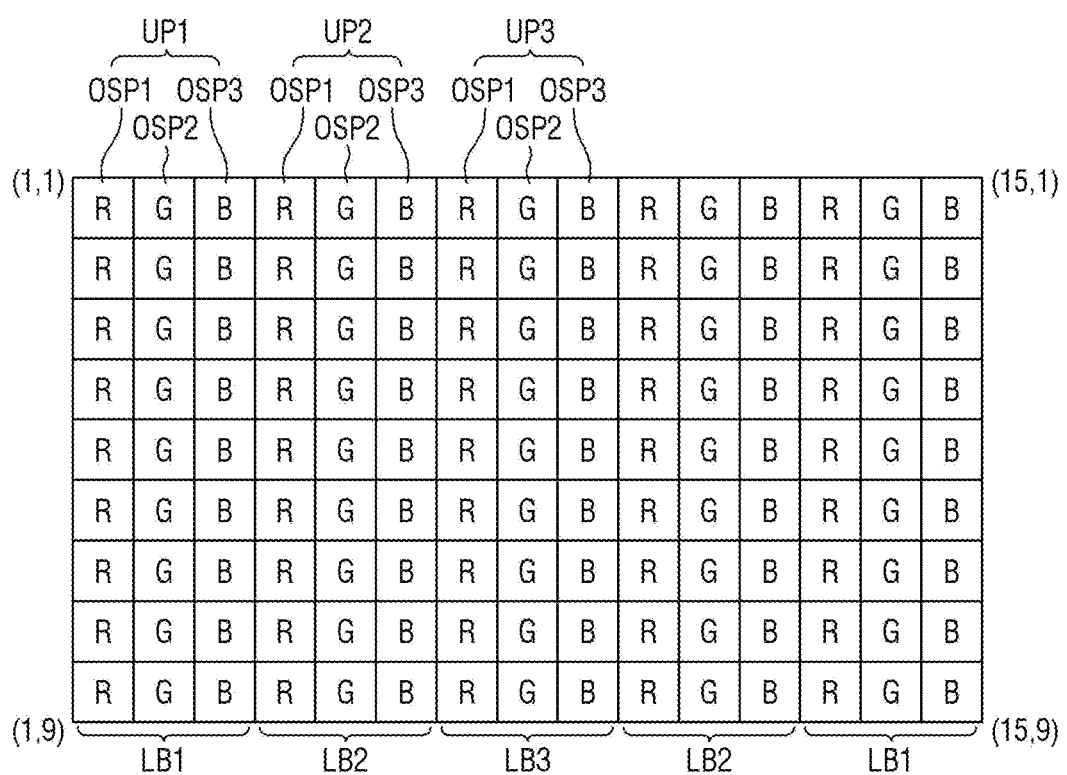
FIG. 15 illustrates an example arrangement structure of light-emitting pixels in the surface light-emitting unit of the surface light source device illustrated in FIGS. 4 and 5.

FIG. 15 illustrates an example arrangement structure of light-emitting pixels OSP in the surface light-emitting unit DU1 of the surface light source device 110 illustrated in FIGS. 4 and 5.

Specifically, FIG. 15 illustrates the arrangement structure of some light-emitting pixels OSP arranged in a 15×9 array on the organic light-emitting display surface DA1. Therefore, FIG. 15 illustrates the arrangement form of the light-emitting pixels OSP from a light-emitting pixel OSP disposed at a 1×1 position to a light-emitting pixel OSP disposed at a 15×9 position.

The organic light-emitting display surface DA1 of the surface light-emitting unit DU1 is divided into a plurality of light-emitting areas, e.g., first through third light-emitting areas LB1 through LB3 in which light-emitting element layers EML1 of the light-emitting pixels OSP are disposed at different heights or different steps.

In an embodiment, a plurality of first unit light-emitting pixels UP1 in which light-emitting element layers EML1 are formed at a preset height of a first step are disposed in a plurality of first light-emitting areas LB1 on the organic light-emitting display surface DA1. Each of the first unit light-emitting pixels UP1 includes first through third sub-light-emitting pixels OSP1 through OSP3 emitting red light, green light, and blue light, respectively. The first unit light-emitting pixels UP1 disposed in each of the first light-emitting areas LB1 emit light through the light-emitting element layers EML1 formed at the preset height of the first step.

A plurality of second unit light-emitting pixels UP2 in which light-emitting element layers EML1 are formed at a height of a second step higher than the height of the first step are disposed in a plurality of second light-emitting areas LB2 on the organic light-emitting display surface DA1. Each of the second unit light-emitting pixels UP2 may also include first through third sub-light-emitting pixels OSP1 through OSP3 emitting red light, green light, and blue light, respectively. The second unit light-emitting pixels UP2 disposed in each of the second light-emitting areas LB2 perform a light-emitting operation through the light-emitting element layers EML1 formed at the height of the second step.

A plurality of third unit light-emitting pixels UP3 in which light-emitting element layers EML1 are formed at a height of a third step higher than the height of the second step are disposed in a plurality of third light-emitting areas LB3 on the organic light-emitting display surface DA1. Each of the third unit light-emitting pixels UP3 may also include first through third sub-light-emitting pixels OSP1 through OSP3 emitting red light, green light, and blue light, respectively. The third unit light-emitting pixels UP3 disposed in each of the third light-emitting areas LB3 perform a light-emitting operation through the light-emitting element layers EML1 formed at the height of the third step.

Figure 16:
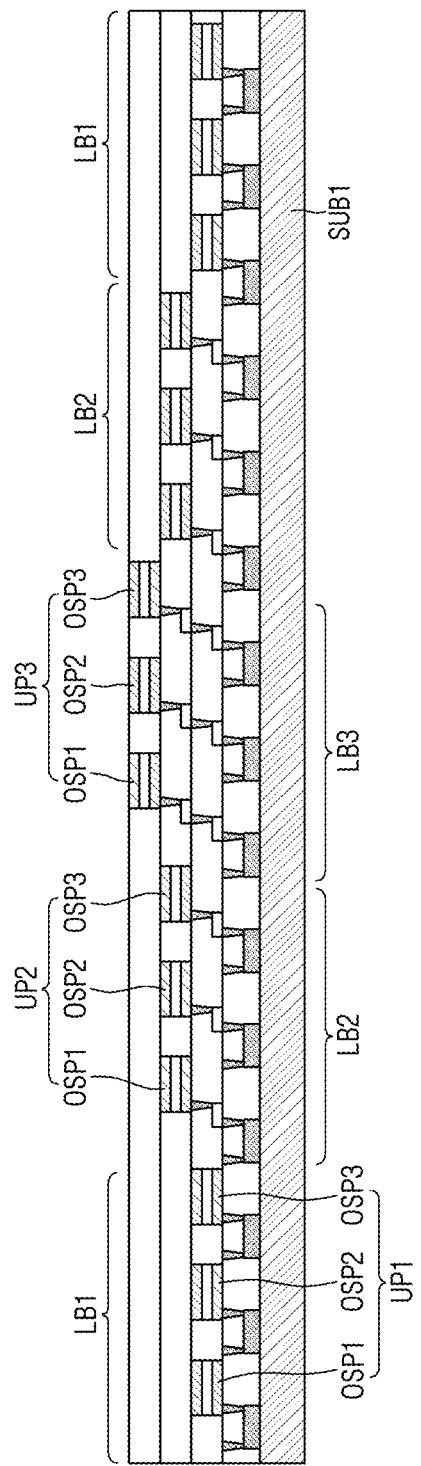
FIG. 16 is a cross-sectional view illustrating an embodiment of the stepped structure of light-emitting pixels in each light-emitting area of a surface light source device.

FIG. 16 is a cross-sectional view illustrating the stepped structure of light-emitting pixels in each light-emitting area of a surface light source device. Specifically, FIG. 16 is a cross-sectional view illustrating the stepped structure of light-emitting pixels arranged in any one light-emitting pixel row of FIG. 15.

Referring to FIG. 16, light-emitting element layers EML1 are formed at a preset height of a first step in a plurality of first unit light-emitting pixels UP1 disposed in a plurality of first light-emitting areas LB1. Accordingly, each of first through third sub-light-emitting pixels OSP1 through OSP3 disposed in the first light-emitting areas LB1 emits light at the height of the first step through a light-emitting element layer EML1 formed at the height of the first step.

Light-emitting element layers EML1 are formed at a height of a second step higher than the first step in a plurality of second unit light-emitting pixels UP2 disposed in a plurality of second light-emitting areas LB2. Accordingly, each of first through third sub-light-emitting pixels OSP1 through OSP3 disposed in the second light-emitting areas LB2 emits light at the height of the second step through a light-emitting element layer EML1 formed at the height of the second step.

Light-emitting element layers EML1 are formed at a height of a third step higher than the second step in a plurality of third unit light-emitting pixels UP3 disposed in a plurality of third light-emitting areas LB3. Accordingly, each of first through third sub-light-emitting pixels OSP1 through OSP3 disposed in the third light-emitting areas LB3 emits light at the height of the third step through a light-emitting element layer EML1 formed at the height of the third step.

Figure 17:
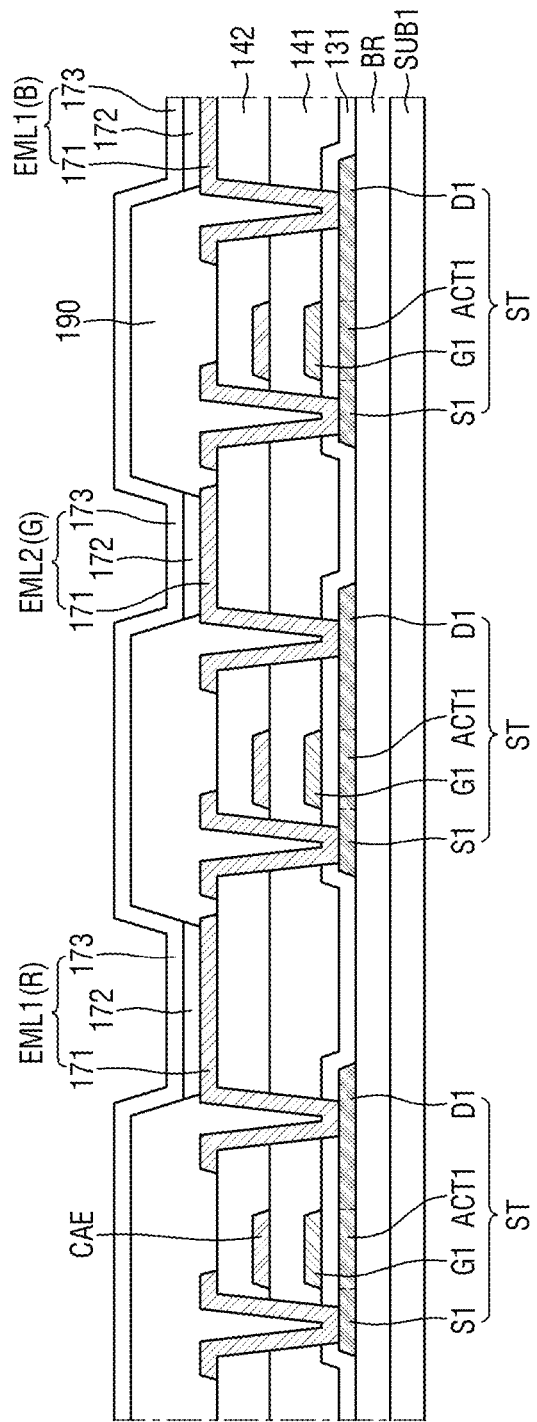
FIG. 17 is a cross-sectional view illustrating in detail the cross-sectional structure of light-emitting pixels formed in a first light-emitting area of a surface light source device.

FIG. 17 is a cross-sectional view illustrating in detail the cross-sectional structure of light-emitting pixels formed in a first light-emitting area LB1 of a surface light source device. Specifically, FIG. 17 is a cross-sectional view illustrating thin-film transistors ST and light-emitting element layers EML1 respectively formed in first through third sub-light-emitting pixels OSP1 through OSP3 of the first light-emitting area LB1.

Referring to FIG. 17, a barrier layer BR may be disposed on a first substrate SUB1. The first substrate SUB1 may include or consist of an insulating material such as a polymer resin. In an embodiment, the first substrate SUB1 may include or consist of PI, for example. The first substrate SUB1 may be a flexible substrate that may be bent, folded, or rolled.

The barrier layer BR is a layer for protecting the thin-film transistors ST of a thin-film transistor layer (e.g., TFTL1 in FIG. 5) and light-emitting layers 172 of the light-emitting element layers EML1 from moisture introduced through the first substrate SUB1 which is vulnerable to moisture penetration. The barrier layer BR may consist of a plurality of inorganic layers stacked alternately.

The thin-film transistors ST of pixel drivers may be formed and disposed on the barrier layer BR. Each of the thin-film transistors ST includes an active layer ACT1, a gate electrode G1, a source electrode S1, and a drain electrode D1.

In an embodiment, the active layers ACT1, the source electrodes S1, and the drain electrodes D1 of the thin-film transistors ST may be disposed on the barrier layer BR, for example. The active layers ACT1 of the thin-film transistor ST include polycrystalline silicon, monocrystalline silicon, low-temperature polycrystalline silicon, amorphous silicon, or an oxide semiconductor. The active layers ACT1 overlapped by the gate electrodes G1 in the thickness direction of the first substrate SUB1 may be defined as channel regions. The source electrodes S1 and the drain electrodes D1 are regions not overlapped by the gate electrodes G1 and may be formed to have conductivity by doping a silicon semiconductor or an oxide semiconductor with ions or impurities.

A gate insulating layer 131 may be disposed on the active layers ACT1, the source electrodes S1, and the drain electrodes D1 of the thin-film transistors ST. The gate insulating layer 131 may include or consist of an inorganic layer, e.g., a silicon nitride layer, a silicon oxynitride layer, a silicon oxide layer, a titanium oxide layer, or an aluminum oxide layer.

The gate electrodes G1 of the thin-film transistors ST may be disposed on the gate insulating layer 131. The gate electrodes G1 may overlap the active layers ACT1 in the thickness direction. Each of the gate electrodes G1 may be a single layer or a multilayer including any one or more of molybdenum (Mo), aluminum (Al), chromium (Cr), gold (Au), titanium (Ti), nickel (Ni), neodymium (Nd), copper (Cu), and alloys thereof.

A first inter-insulating layer 141 may be disposed on the gate electrodes G1 of the thin-film transistors ST. The first inter-insulating layer 141 may include or consist of an inorganic layer, e.g., a silicon nitride layer, a silicon oxynitride layer, a silicon oxide layer, a titanium oxide layer, or an aluminum oxide layer. The first inter-insulating layer 141 may include a plurality of inorganic layers.

Capacitor electrodes CAE may be disposed on the first inter-insulating layer 141. The capacitor electrodes CAE may overlap the gate electrodes G1 of the thin-film transistors ST in the thickness direction. Since the first inter-insulating layer 141 has a predetermined dielectric constant, capacitors may be formed by the capacitor electrodes CAE, the gate electrodes G1, and the first inter-insulating layer 141 disposed between them. Each of the capacitor electrodes CAE may be a single layer or a multilayer including any one or more of molybdenum (Mo), aluminum (Al), chromium (Cr), gold (Au), titanium (Ti), nickel (Ni), neodymium (Nd), copper (Cu), and alloys thereof.

A second inter-insulating layer 142 may be disposed on the capacitor electrodes CAE. The second inter-insulating layer 142 may include or consist of an inorganic layer, e.g., a silicon nitride layer, a silicon oxynitride layer, a silicon oxide layer, a titanium oxide layer, or an aluminum oxide layer. The second inter-insulating layer 142 may include a plurality of inorganic layers.

A plurality of contact holes are defined in the first and second inter-insulating layers 141 and 142, and source electrode terminals and first light-emitting electrodes 171 utilized as anodes are formed in the contact holes of the first and second inter-insulating layers 141 and 142.

A pixel defining layer 190 may be formed on the second inter-insulating layer 142 to separate the first light-emitting electrodes 171.

In an emission area of each of the light-emitting pixels OSP1 through OSP3, a light-emitting element layer EML1 including a first light-emitting electrode 171, an organic light-emitting layer 172 and a common electrode 173 disposed sequentially is formed at a preset height of a first step.

Figure 18:
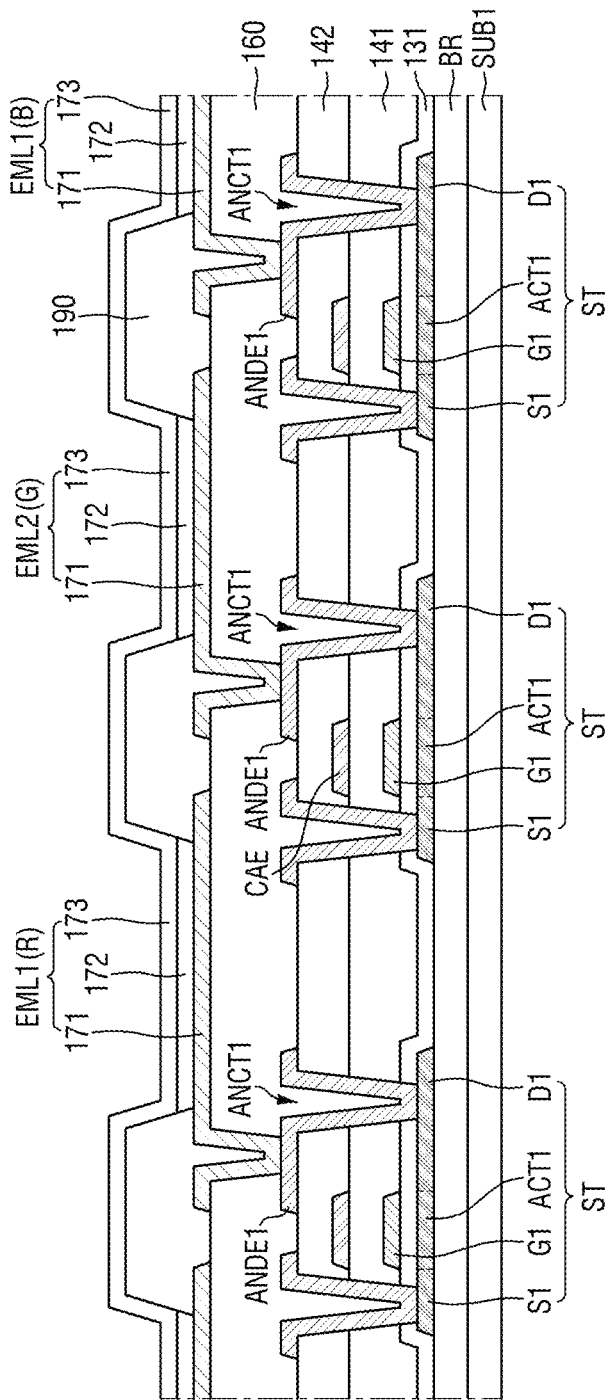
FIG. 18 is a cross-sectional view illustrating in detail the cross-sectional structure of light-emitting pixels formed in a second light-emitting area of the surface light source device.

FIG. 18 is a cross-sectional view illustrating in detail the cross-sectional structure of light-emitting pixels formed in a second light-emitting area of the surface light source device. Specifically, FIG. 18 is a cross-sectional view illustrating thin-film transistors ST and light-emitting element layers EML1 respectively formed in first through third sub-light-emitting pixels OSP1 through OSP3 of the second light-emitting area LB2.

The thin-film transistors ST of the first through third sub-light-emitting pixels OSP1 through OSP3 disposed in the second light-emitting area LB2 are formed on the same step layer and through the same process as the thin-film transistors ST formed in the first light-emitting area LB1.

However, in the thin-film transistors ST of the first through third sub-light-emitting pixels OSP1 through OSP3 disposed in the second light-emitting area LB2, first anode connection electrodes ANDE1 are disposed in contact holes penetrating first and second inter-insulating layers 141 and 142. In an embodiment, the first anode connection electrodes ANDE1 may be connected to drain electrodes D1 of the thin-film transistors ST through first connection contact holes ANCT1 penetrating a gate insulating layer 131, the first inter-insulating layer 141, and the second inter-insulating layer 142, for example. Each of the first anode connection electrodes ANDE1 may be a single layer or a multilayer including any one or more of molybdenum (Mo), aluminum (Al), chromium (Cr), gold (Au), titanium (Ti), nickel (Ni), neodymium (Nd), copper (Cu), and alloys thereof.

A first planarization layer 160 may be disposed on the first anode connection electrodes ANDE1 to planarize steps formed by the thin-film transistors ST. The first planarization layer 160 may include or consist of an organic layer such as acryl resin, epoxy resin, phenolic resin, polyamide resin, or PI resin.

A plurality of connection contact holes are defined in the first planarization layer 160, and first light-emitting electrodes 171 utilized as anodes are formed in the connection contact holes of the first planarization layer 160. The first light-emitting electrodes 171 disposed in the first and second light-emitting areas LB1 and LB2 may be simultaneously formed through the same patterning process.

A pixel defining layer 190 may be formed on the first planarization layer 160 to separate the first light-emitting electrodes 171. The pixel defining layers 190 respectively disposed in the first and second light-emitting areas LB1 and LB2 may also be simultaneously formed through the same patterning process.

In an emission area of each of the light-emitting pixels OSP1 through OSP3, a light-emitting element layer EML1 including a first light-emitting electrode 171, an organic light-emitting layer 172 and a common electrode 173 disposed sequentially is formed at a preset height of a second step. The light-emitting element layers EML1 formed in the first and second light-emitting areas LB1 and LB2 may be simultaneously formed through the same patterning process, but are formed to have different steps at the first and second heights.

Figure 19:
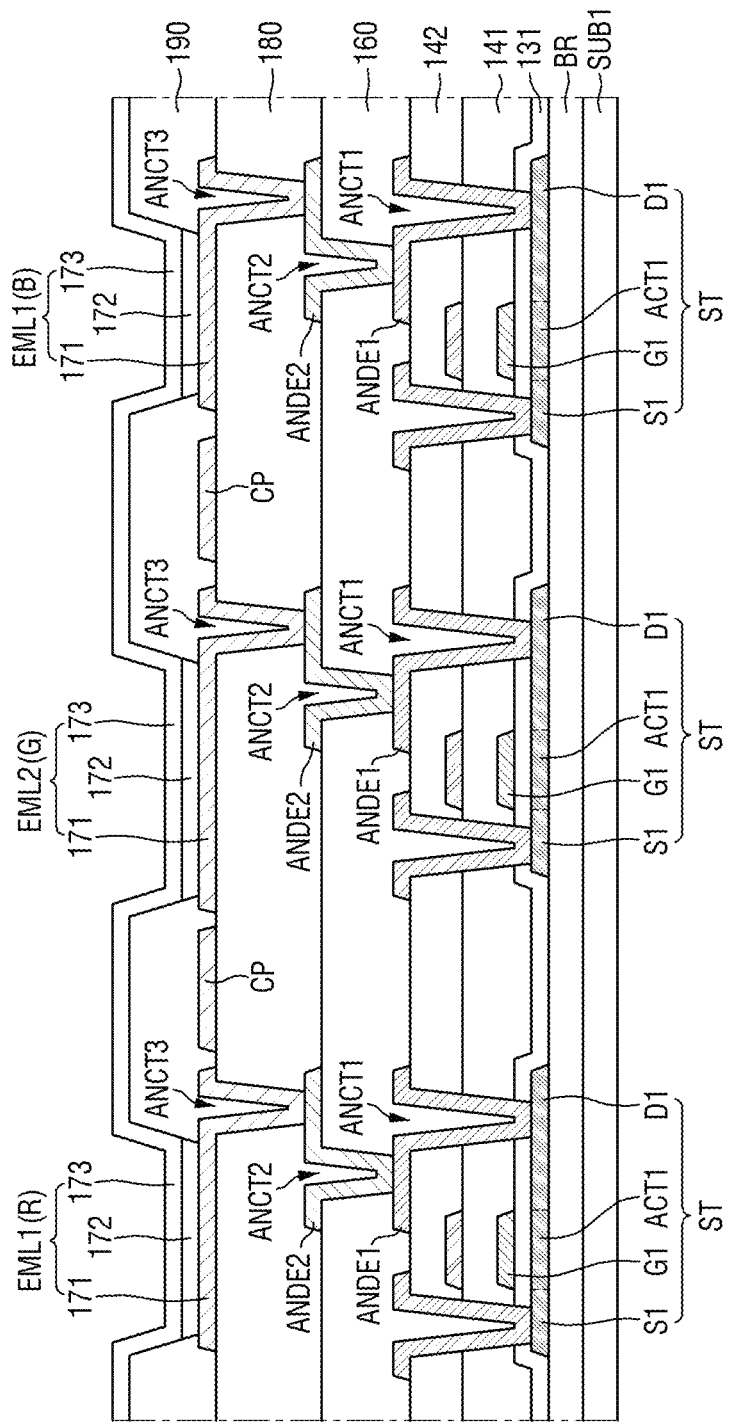
FIG. 19 is a cross-sectional view illustrating in detail the cross-sectional structure of light-emitting pixels formed in a third light-emitting area of the surface light source device.

FIG. 19 is a cross-sectional view illustrating in detail the cross-sectional structure of light-emitting pixels formed in a third light-emitting area LB3 of the surface light source device. Specifically, FIG. 19 is a cross-sectional view illustrating thin-film transistors ST and light-emitting element layers EML1 respectively formed in first through third sub-light-emitting pixels OSP1 through OSP3 of the third light-emitting area LB3.

The thin-film transistors ST of the first through third sub-light-emitting pixels OSP1 through OSP3 disposed in the third light-emitting area LB3 are formed on the same step layer and through the same process as the thin-film transistors ST formed in the first and second light-emitting areas LB1 and LB2.

However, second anode connection electrodes ANDE2 may be disposed on a first planarization layer 160 formed in the third light-emitting area LB3. The second anode connection electrodes ANDE2 may be connected to first anode connection electrodes ANDE1 through second connection contact holes ANCT2 penetrating the first planarization layer 160. Each of the second anode connection electrodes ANDE2 may be a single layer or a multilayer including any one or more of molybdenum (Mo), aluminum (Al), chromium (Cr), gold (Au), titanium (Ti), nickel (Ni), neodymium (Nd), copper (Cu), and alloys thereof.

A second planarization layer 180 may be disposed on the second anode connection electrodes ANDE2. The second planarization layer 180 may include or consist of an organic layer such as acryl resin, epoxy resin, phenolic resin, polyamide resin, or PI resin.

A plurality of connection contact holes ANCT3 are defined in the second planarization layer 180, and first light-emitting electrodes 171 utilized as anodes are formed in the connection contact holes ANCT3 of the second planarization layer 180. The first light-emitting electrodes 171 disposed in the first through third light-emitting areas LB1 through LB3 may be simultaneously formed through the same patterning process.

A pixel defining layer 190 may be formed on the second planarization layer 180 to separate the first light-emitting electrodes 171. The pixel defining layers 190 respectively disposed in the first through third light-emitting areas LB1 through LB3 may also be simultaneously formed through the same patterning process.

In an emission area of each of the light-emitting pixels OSP1 through OSP3, a light-emitting element layer EML1 including a first light-emitting electrode 171, an organic light-emitting layer 172 and a common electrode 173 disposed sequentially is formed at a preset height of a third step. The light-emitting element layers EML1 formed in the first through third light-emitting areas LB1 through LB3 may be simultaneously formed through the same patterning process, but are formed to have different steps at the first through third heights.

Figure 20:
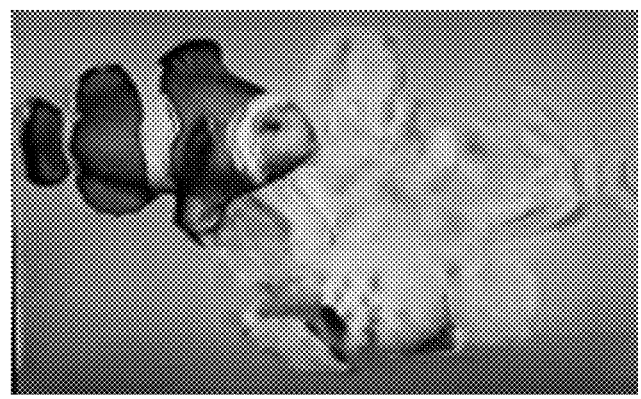
FIG. 20 shows an embodiment of background light and background light display resolution of first light-emitting areas.

FIG. 20 shows background light and background light display resolution of first light-emitting areas LB1.

Referring to FIG. 20, a first data processor 140 of a surface light source device 110 extracts and divides holographic content image data of the first light-emitting areas LB1 corresponding to positions of sub-light-emitting pixels OSP1 through OSP3 disposed in the first light-emitting areas LB1 from holographic content image data input from the outside. The first data processor 140 transmits the extracts and divides holographic content image data of the first light-emitting areas LB1 to an emission driving circuit 120 of the surface light source device 110.

The emission driving circuit 120 receives the extracts or divide holographic content image data of the first light-emitting areas LB1 from the first data processor 140 and arranges the extracts or divide holographic content image data according to the position of each of the sub-light-emitting pixels OSP1 through OSP3 in the first light-emitting areas LB1.

Figure 21:
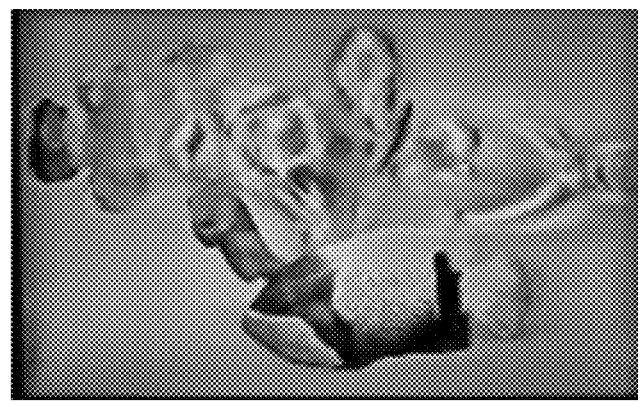
FIG. 21 shows an embodiment of background light and background light display resolution of second light-emitting areas.

FIG. 21 shows background light and background light display resolution of second light-emitting areas LB2.

Referring to FIG. 21, the first data processor 140 of the surface light source device 110 extracts and divides holographic content image data of the second light-emitting areas LB2 corresponding to positions of sub-light-emitting pixels OSP1 through OSP3 disposed in the second light-emitting areas LB2 from the holographic content image data input from the outside. The first data processor 140 transmits the extracted holographic content image data of the second light-emitting areas LB2 to the emission driving circuit 120 of the surface light source device 110.

The emission driving circuit 120 receives the extracted holographic content image data of the second light-emitting areas LB2 from the first data processor 140 and arranges the extracts and divided holographic content image data according to the position of each of the sub-light-emitting pixels OSP1 through OSP3 in the second light-emitting areas LB2.

Figure 22:
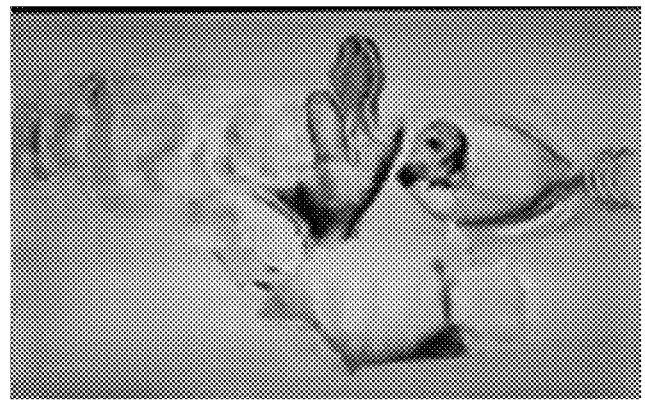
FIG. 22 shows an embodiment of background light and background light display resolution of third light-emitting areas.

FIG. 22 shows background light and background light display resolution of third light-emitting areas LB3.

Referring to FIG. 22, the first data processor 140 of the surface light source device 110 extracts and divides holographic content image data of the third light-emitting areas LB3 corresponding to positions of sub-light-emitting pixels OSP1 through OSP3 disposed in the third light-emitting areas LB3 from the holographic content image data input from the outside. The first data processor 140 transmits the extracted holographic content image data of the third light-emitting areas LB3 to the emission driving circuit 120 of the surface light source device 110.

The emission driving circuit 120 receives the extracted holographic content image data of the third light-emitting areas LB3 from the first data processor 140 and arranges the extracted holographic content image data according to the position of each of the sub-light-emitting pixels OSP1 through OSP3 in the third light-emitting areas LB3.

Figure 23:
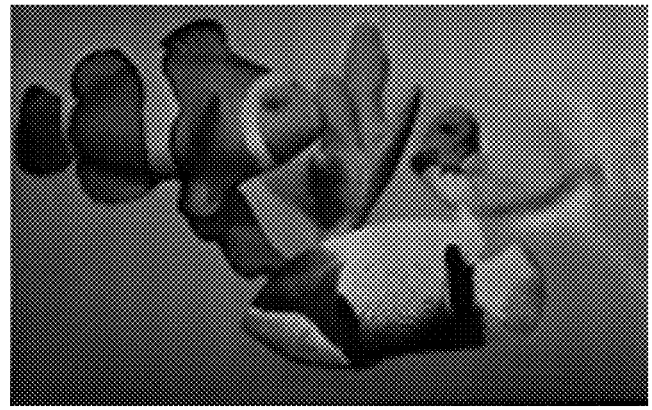
FIG. 23 shows an embodiment of a display image and image display resolution of a spatial light modulator.

FIG. 23 shows a display image and image display resolution of a spatial light modulator 210.

Referring to FIG. 23, the emission driving circuit 120 converts the holographic content image data of each of the first through third light-emitting areas LB1 through LB3 into an analog image signal for the first, second or third light-emitting areas LB1, LB2 or LB3 and supplies the analog image signal to light-emitting pixels arranged on an organic light-emitting display surface DA1 of a surface light-emitting unit DU1.

A surface light-emitting image FH (110) divided into the first through third light-emitting areas LB1 through LB3 is disposed on the organic light-emitting display surface DA1 of the surface light-emitting unit DU1, and image display light for each of the first through third light-emitting areas LB1 through LB3 is provided to the spatial light modulator 210 as a surface light source and as background light.

The surface light-emitting unit DU1 generates image display light at a different step height for each of the first through third light-emitting areas LB1 through LB3 and provides 3D image display light of different step heights to the spatial light modulator 210 as background light, thereby further improving a 3D effect of a holographic image.

Figure 24:
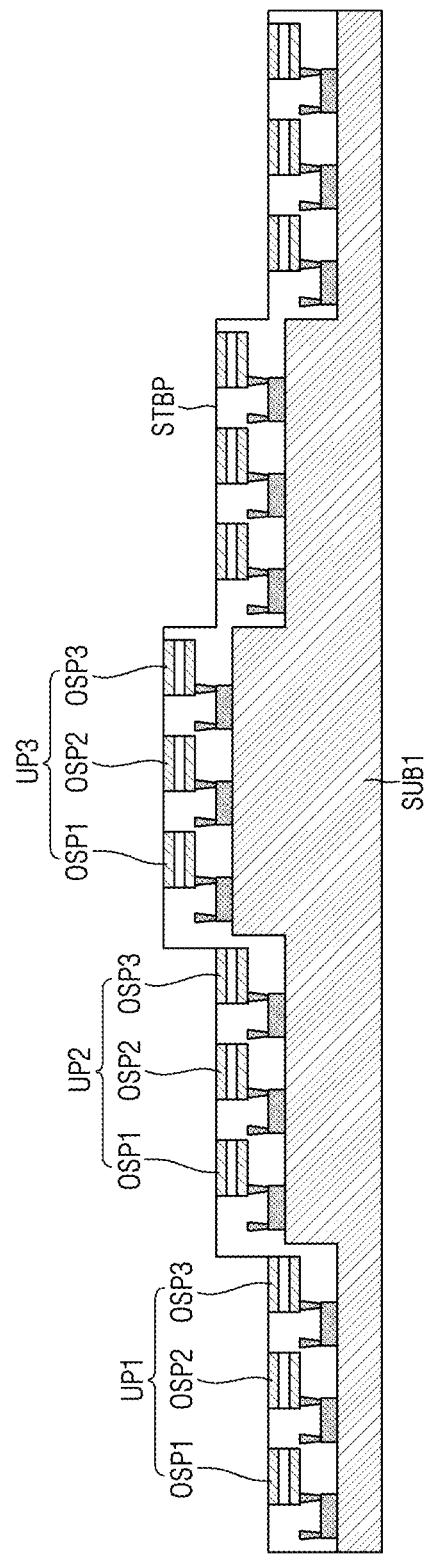
FIG. 24 is a cross-sectional view illustrating an embodiment of the stepped structure of light-emitting pixels in each light-emitting area of a surface light source device.

FIG. 24 is a cross-sectional view illustrating the stepped structure of light-emitting pixels in each light-emitting area of a surface light source device 110.

Referring to FIG. 24, a surface light-emitting unit DU1 of the surface light source device 110 may be formed on an elastic substrate and may be formed in the form of a stretchable type panel STBP. A first substrate SUB1 on which the surface light-emitting unit DU1 is formed may be a flexible substrate that may be bent, folded, or rolled. In an embodiment, the first substrate SUB1 may include a glass material or a metal material, for example. However, the disclosure is not limited thereto. In another embodiment, the first substrate SUB1 may include polymer resin such as PI.

The stretchable-type surface light-emitting unit DU1 that may be flexibly transformed may be disposed on a separate device substrate SUB1 having a different step for each of first through third light-emitting areas LB1 through LB3. Thus, the third light-emitting areas LB1 through LB3 may be disposed at different steps.

An emission driving circuit 120 converts holographic content image data of each of the first through third light-emitting areas LB1 through LB3 into an analog image signal for the first, second or third light-emitting areas LB1, LB2 or LB3 and supplies the analog image signal to light-emitting pixels arranged on an organic light-emitting display surface DA1 of the surface light-emitting unit DU1.

Accordingly, a surface light-emitting image FH (110) divided into the first through third light-emitting areas LB1 through LB3 is disposed on the organic light-emitting display surface DA1 of the surface light-emitting unit DU1, and image display light for each of the first through third light-emitting areas LB1 through LB3 is provided to the spatial light modulator 210 as a surface light source and as background light.

The surface light-emitting unit DU1 generates image display light at a different step height for each of the first through third light-emitting areas LB1 through LB3 and provides 3D image display light of different step heights to the spatial light modulator 210 as background light, thereby further improving a 3D effect of a holographic image.

A hologram display device in an embodiment of the disclosure may increase the resolution and 3D effect of a holographic image by modulating the resolution and 3D effect of a surface light source device that provides background light to a spatial light modulator.

In addition, a hologram display device in an embodiment of the disclosure may generate image display light at a different step for each light-emitting area of a surface light source device and provide the image display light of different steps to a spatial light modulator as background light, thereby further improving a 3D effect of a holographic image.

However, the effects of the disclosure are not restricted to the one set forth herein. The above and other effects of the disclosure will become more apparent to one of daily skill in the art to which the disclosure pertains by referencing the claims.

In concluding the detailed description, those skilled in the art will appreciate that many variations and modifications may be made to the preferred embodiments without substantially departing from the principles of the disclosure. Therefore, the disclosed preferred embodiments of the disclosure are used in a generic and descriptive sense only and not for purposes of limitation.

What is claimed is:

1. A hologram display device comprising:
   a spatial light modulator which displays a holographic content image;
   a surface light source device which generates image display light of a first resolution from behind the spatial light modulator and provides the image display light of the first resolution to the spatial light modulator as background light, the surface light source device comprising:
   a first data processor; and
   an emission driving circuit; and
   at least one image transmission member which defines a display path of the holographic content image,
   wherein the spatial light modulator generates a holographic content image of a second resolution by the image display light of the first resolution as the background light, and the at least one image transmission member defines a display path of a holographic content image of a third resolution in which the image display light of the first resolution and the holographic content image of the second resolution are mixed,
   the first data processor generates holographic content image data of the first resolution from holographic content image data input from the outside or converts the holographic content image data input from the outside into the holographic content image data of the first resolution, and
   the emission driving circuit converts the holographic content image data of the first resolution into an analog image signal.

2. The hologram display device of claim 1, wherein the surface light source device further comprises:
   an organic light-emitting display unit which generates the image display light of the first resolution as a surface light source,
   wherein the emission driving circuit supplies the analog image signal to organic light-emitting pixels of the organic light-emitting display unit.

3. The hologram display device of claim 2, wherein the spatial light modulator comprises:
- a liquid crystal image display unit which displays the holographic content image of the second resolution on a front surface by, as the background light, the image display light of the first resolution provided from the surface light source device disposed behind the spatial light modulator;
- a second data processor which extracts holographic content image data of the second resolution from the holographic content image data input from the outside or converts the holographic content image data input from the outside into the holographic content image data of the second resolution; and
- a display driving circuit which converts the holographic content image data of the second resolution into an analog image signal and supplies the analog image signal to liquid crystal pixels of the liquid crystal image display unit.

4. The hologram display device of claim 3, wherein the first resolution is a resolution preset to be lower than the second resolution, and the third resolution is a mixture of the first resolution and the second resolution.

5. The hologram display device of claim 2, wherein the organic light-emitting display unit of the surface light source device is divided in advance into a plurality of light-emitting areas in which light-emitting element layers of the organic light-emitting pixels are disposed at different heights or different steps.

6. The hologram display device of claim 5, wherein a plurality of first unit light-emitting pixels in which the light-emitting element layers are formed at a preset height of a first step are disposed in a plurality of first light-emitting areas among the light-emitting areas into which the organic light-emitting display unit is divided, a plurality of second unit light-emitting pixels in which the light-emitting element layers are formed at a height of a second step higher than the height of the first step are disposed in a plurality of second light-emitting areas among the light-emitting areas, and a plurality of third unit light-emitting pixels in which the light-emitting element layers are formed at a height of a third step higher than the height of the second step are disposed in a plurality of third light-emitting areas among the light-emitting areas.

7. The hologram display device of claim 6, wherein the first data processor extracts and divides holographic content image data of each of the plurality of first light-emitting areas through the plurality of third light-emitting areas, which corresponds to positions of the organic light-emitting pixels disposed in the plurality of first light-emitting areas, the plurality of second light-emitting areas or the plurality of third light-emitting areas, from the holographic content image data of the first resolution.

8. The hologram display device of claim 7, wherein the emission driving circuit converts the holographic content image data of each of the plurality of first light-emitting areas through the plurality of third light-emitting areas into an analog image signal for the plurality of first light-emitting areas, the plurality of second light-emitting areas or the plurality of third light-emitting areas and supplies the analog image signal to the organic light-emitting pixels in the plurality of first light-emitting areas, the plurality of second light-emitting areas or the plurality of third light-emitting areas of the organic light-emitting display unit.

9. A hologram display device comprising:
- a spatial light modulator which displays a holographic content image;
- a surface light source device which generates image display light of a first resolution from behind the spatial light modulator and provides the image display light of the first resolution to the spatial light modulator as background light; and
- at least one image transmission member which defines a display path of the holographic content image,
- wherein the spatial light modulator generates a holographic content image of a second resolution by the image display light of the first resolution as the background light, and the at least one image transmission member defines a display path of a holographic content image of a third resolution in which the image display light of the first resolution and the holographic content image of the second resolution are mixed, wherein the surface light source device generates the image display light of the first resolution as the surface light source by converting holographic content image data input from the outside into holographic content image data of the first resolution, converting the holographic content image data of the first resolution into an analog image signal, and supplying the analog image signal to organic light-emitting pixels of an organic light-emitting display unit.

10. The hologram display device of claim 9, wherein the spatial light modulator converts the holographic content image data input from the outside into holographic content image data of the second resolution, converts the holographic content image data of the second resolution into an analog image signal and supplies the analog image signal to liquid crystal pixels of a liquid crystal image display unit, and displays the holographic content image of the second resolution on a front surface by, as the background light, the image display light of the first resolution provided from the surface light source device disposed behind the spatial light modulator.

11. A hologram display device comprising:
- a spatial light modulator which displays a holographic content image;
- a surface light source device which generates image display light of a first resolution from behind the spatial light modulator and provides the image display light of the first resolution to the spatial light modulator as background light; and
- at least one image transmission member which defines a display path of the holographic content image,
- wherein the spatial light modulator generates a holographic content image of a second resolution by the image display light of the first resolution as the background light, and the at least one image transmission member defines a display path of a holographic content image of a third resolution in which the image display light of the first resolution and the holographic content image of the second resolution are mixed, wherein the first resolution is a resolution preset to be lower than the second resolution, and the third resolution is a mixture of the first resolution and the second resolution, and
- wherein the surface light source device generates the image display light of the first resolution as a surface light source by converting the holographic content image data input from the outside into the holographic content image data of the first resolution, and converting the holographic content image data of the first resolution into an analog image signal.

12. The hologram display device of claim 11, wherein the surface light source device supplies the analog image signal to organic light-emitting pixels of an organic light-emitting display unit.

13. The hologram display device of claim 12, wherein the spatial light modulator converts the holographic content image data input from the outside into holographic content image data of the second resolution, converts the holographic content image data of the second resolution into an analog image signal and supplies the analog image signal to liquid crystal pixels of a liquid crystal image display unit, and displays the holographic content image of the second resolution on a front surface by, as the background light, the image display light of the first resolution provided from the surface light source device disposed behind the spatial light modulator.

14. The hologram display device of claim 11, wherein the surface light source device comprises:
   an organic light-emitting display unit which generates the image display light of the first resolution as the surface light source;
   a first data processor which extracts holographic content image data of the first resolution from holographic content image data input from the outside or converts the holographic content image data input from the outside into the holographic content image data of the first resolution; and
   an emission driving circuit which converts the holographic content image data of the first resolution into an analog image signal and supplies the analog image signal to organic light-emitting pixels of the organic light-emitting display unit.

15. The hologram display device of claim 14, wherein the spatial light modulator comprises:
   a liquid crystal image display unit which displays the holographic content image of the second resolution on a front surface by, as the background light, the image display light of the first resolution provided from the surface light source device disposed behind the spatial light modulator;
   a second data processor which extracts holographic content image data of the second resolution from the holographic content image data input from the outside or converts the holographic content image data input from the outside into the holographic content image data of the second resolution; and
   a display driving circuit which converts the holographic content image data of the second resolution into an analog image signal and supplies the analog image signal to liquid crystal pixels of the liquid crystal image display unit.

16. The hologram display device of claim 14, wherein the organic light-emitting display unit of the surface light source device is divided in advance into a plurality of light-emitting areas in which light-emitting element layers of the organic light-emitting pixels are disposed at different heights or different steps.

17. The hologram display device of claim 16, wherein a plurality of first unit light-emitting pixels in which the light-emitting element layers are formed at a preset height of a first step are disposed in a plurality of first light-emitting areas among the light-emitting areas into which the organic light-emitting display unit is divided, a plurality of second unit light-emitting pixels in which the light-emitting element layers are formed at a height of a second step higher than the height of the first step are disposed in a plurality of second light-emitting areas among the light-emitting areas, and a plurality of third unit light-emitting pixels in which the light-emitting element layers are formed at a height of a third step higher than the height of the second step are disposed in a plurality of third light-emitting areas among the light-emitting areas.

18. The hologram display device of claim 17, wherein the first data processor extracts and divides holographic content image data of each of the plurality of first light-emitting areas through the plurality of third light-emitting areas, which corresponds to positions of the organic light-emitting pixels disposed in the plurality of first light-emitting areas, the plurality of second light-emitting areas or the plurality of third light-emitting areas, from the holographic content image data of the first resolution.

19. An electronic device including a hologram display device,
   wherein the hologram display device comprising:
      a spatial light modulator which displays a holographic content image;
      a surface light source device which generates image display light of a first resolution from behind the spatial light modulator and provides the image display light of the first resolution to the spatial light modulator as background light, the surface light source device comprising:
         a first data processor; and
         an emission driving circuit; and
      at least one image transmission member which defines a display path of the holographic content image,
   wherein the spatial light modulator generates a holographic content image of a second resolution by the image display light of the first resolution as the background light, and the at least one image transmission member defines a display path of a holographic content image of a third resolution in which the image display light of the first resolution and the holographic content image of the second resolution are mixed,
   the first data processor generates holographic content image data of the first resolution from holographic content image data input from the outside or converts the holographic content image data input from the outside into the holographic content image data of the first resolution, and
   the emission driving circuit converts the holographic content image data of the first resolution into an analog image signal.

* * * * *